US010560816B2

(12) United States Patent
Sohn et al.

(10) Patent No.: US 10,560,816 B2
(45) Date of Patent: Feb. 11, 2020

(54) ELECTRONIC DEVICE AND METHOD FOR SETTING SOFTWARE IN ELECTRONIC DEVICE

(71) Applicant: Samsung Electronics Co., Ltd., Suwon-si, Gyeonggi-do (KR)

(72) Inventors: Dong-Jin Sohn, Seongnam-si (KR); Hee-Hyun Kang, Suwon-si (KR); Eun-Seob Ko, Seoul (KR); Tae-Wan Kim, Seoul (KR); So-Ra Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 15/291,492

(22) Filed: Oct. 12, 2016

(65) Prior Publication Data
US 2017/0127214 A1 May 4, 2017

(30) Foreign Application Priority Data
Oct. 29, 2015 (KR) .................. 10-2015-0150794

(51) Int. Cl.
*G06F 9/46* (2006.01)
*H04W 4/12* (2009.01)
*H04W 8/26* (2009.01)

(52) U.S. Cl.
CPC .............. *H04W 4/12* (2013.01); *H04W 8/265* (2013.01)

(58) Field of Classification Search
CPC .......... H04W 4/12–50; H04W 8/18–30; G06F 8/10–78; G06F 9/4498; G06F 9/4843; G06F 2209/482
See application file for complete search history.

(56) References Cited

U.S. PATENT DOCUMENTS

| 8,346,255 | B2 * | 1/2013 | Kukuchka ............... H04W 8/18 |
| | | | 455/432.1 |
| 9,712,973 | B2 * | 7/2017 | Shih ....................... H04W 4/025 |
| 9,913,131 | B2 * | 3/2018 | Bai ......................... H04W 8/183 |
| 2007/0028109 | A1 | 2/2007 | Wysocki et al. |
| 2009/0061840 | A1 | 3/2009 | Fleischman et al. |
| 2009/0064038 | A1 | 3/2009 | Fleischman et al. |
| 2009/0181662 | A1 | 7/2009 | Fleischman et al. |
| 2011/0007895 | A1 | 1/2011 | Wysocki et al. |
| 2011/0177811 | A1 | 7/2011 | Heckman et al. |
| 2011/0195700 | A1 * | 8/2011 | Kukuchka ............... H04W 8/18 |
| | | | 455/422.1 |

(Continued)

FOREIGN PATENT DOCUMENTS

KR 10-2013-0110901 A 10/2013

*Primary Examiner* — Camquy Truong
(74) *Attorney, Agent, or Firm* — Jefferson IP Law, LLP

(57) ABSTRACT

An electronic device and an operating method in the electronic device are provided. The operating method includes identifying subscriber identity module (SIM) information corresponding to a SIM, which is functionally connected with the electronic device, transmitting the SIM information to an external device, receiving configuration information related to one or more network providers corresponding to the SIM information, and changing at least a portion of the software that is stored in the memory that is functionally connected with the electronic device or obtaining other software based on at least a portion of the received configuration information.

18 Claims, 29 Drawing Sheets

(56) References Cited

U.S. PATENT DOCUMENTS

| | | |
|---|---|---|
| 2011/0250909 A1 | 10/2011 | Mathias et al. |
| 2012/0046040 A1 | 2/2012 | Chatterjee |
| 2012/0077496 A1 | 3/2012 | Mathias et al. |
| 2012/0081732 A1* | 4/2012 | Sugaya .............. H04N 1/00204 358/1.13 |
| 2012/0309377 A1 | 12/2012 | De Atley et al. |
| 2013/0115948 A1 | 5/2013 | Kukuchka et al. |
| 2013/0231146 A1 | 9/2013 | Mathias et al. |
| 2013/0260832 A1 | 10/2013 | Park et al. |
| 2014/0106730 A1 | 4/2014 | Chatterjee |
| 2014/0349634 A1 | 11/2014 | Kukuchka et al. |
| 2015/0215773 A1* | 7/2015 | Bai ....................... H04W 8/183 455/418 |
| 2015/0312717 A1* | 10/2015 | Shih ..................... H04W 8/183 455/456.1 |
| 2016/0021532 A1* | 1/2016 | Schenk ............... H04B 1/3816 455/558 |
| 2017/0280313 A1* | 9/2017 | Zhu ....................... H04W 64/00 |
| 2017/0280379 A1* | 9/2017 | Axmon ................ H04W 48/14 |

\* cited by examiner

ELECTRONIC DEVICE AND METHOD FOR SETTING SOFTWARE IN ELECTRONIC DEVICE

CROSS-REFERENCE TO RELATED APPLICATION(S)

This application claims the benefit under 35 U.S.C. § 119(a) of a Korean patent application filed on Oct. 29, 2015 in the Korean Intellectual Property Office and assigned Serial number 10-2015-0150794, the entire disclosure of which is hereby incorporated by reference.

TECHNICAL FIELD

The present disclosure relates to an electronic device and a method for setting software in the electronic device.

BACKGROUND

Recently, electronic devices have been developed to use various functions that are related to applications. For example, electronic devices (e.g., smart phones) may receive information that is related to the configuration of the electronic device from a server, and the electronic device may be configured based on the received information.

Electronic devices have recently been developed to use various functions. The electronic devices are provided with a display unit in order to more effectively utilize the various functions. For example, current smart phones adopt a display unit (e.g., a touch screen), which senses a touch, on the front side thereof.

In addition, a wide range of applications (or "apps") may be installed and executed in the electronic devices. Various input means (e.g., a touch screen, buttons, a mouse, a keyboard, sensors, etc.) may be used to execute and control the applications in the electronic device.

The above information is presented as background information only to assist with an understanding of the present disclosure. No determination has been made, and no assertion is made, as to whether any of the above might be applicable as prior art with regard to the present disclosure.

SUMMARY

The manufacturer of the electronic device may issue or verify the applications of the electronic device according to providers related to the electronic device or the region where the electronic device performs communication, and may install the applications in the electronic device. In addition, it may take a long time to develop and produce the applications because the manufacturer should set the configuration of each application and issue the applications by reflecting the demands of the providers, and it may be difficult to manage the stock of the software because the software should be issued according to the demands of the providers or the region.

Aspects of the present disclosure are to address at least the above-mentioned problems and/or disadvantages and to provide at least the advantages described below. Accordingly, an aspect of the present disclosure is to provide an electronic device and a method for setting software in the electronic device. The software may be issued for the open market to then be installed in the electronic device, and if the electronic device is activated for use, the provider of the corresponding electronic device is recognized in order to thereby control to set the software configuration through a communication system.

In accordance with an aspect of the present disclosure, an electronic device is provided. The electronic device includes a communication unit, a memory, and a processor that is configured to identify subscriber identity module (SIM) information corresponding to a SIM, which is functionally connected with the electronic device, transmit the SIM information to an external device through the communication unit, receive configuration information related to one or more network providers corresponding to the SIM information through the communication unit, and change at least a portion of the software stored in the memory or obtain other software based on at least a portion of the configuration information.

In accordance with another aspect of the present disclosure, an operating method of an electronic device is provided. The operating method includes identifying SIM information corresponding to a SIM, which is functionally connected with the electronic device, transmitting the SIM information to an external device, receiving configuration information related to one or more network providers corresponding to the SIM information, and changing at least a portion of the software that is stored in the memory that is functionally connected with the electronic device or obtaining other software based on at least a portion of the received configuration information.

In accordance with another aspect of the present disclosure, an electronic device is provided. The electronic device includes a communication unit and a processor that is configured to receive SIM information corresponding to a SIM, which is functionally connected with an external device, from the external device, and transmit, to the external device, configuration information that is related to one or more network providers corresponding to the SIM information such that the external device changes at least a portion of the software that is stored in the memory, which is functionally connected with the external device, or obtains other software.

In the electronic device and the method for setting software in the electronic device, according to aspects of the present disclosure, default software is issued and installed in the electronic device and configuration information of the software is set through a communication network when activating the electronic device for use. Therefore, since the issuance of the software and the software configuration information can be separately managed, the manufacturer can develop integrated software and can effectively manage the stock of the software.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
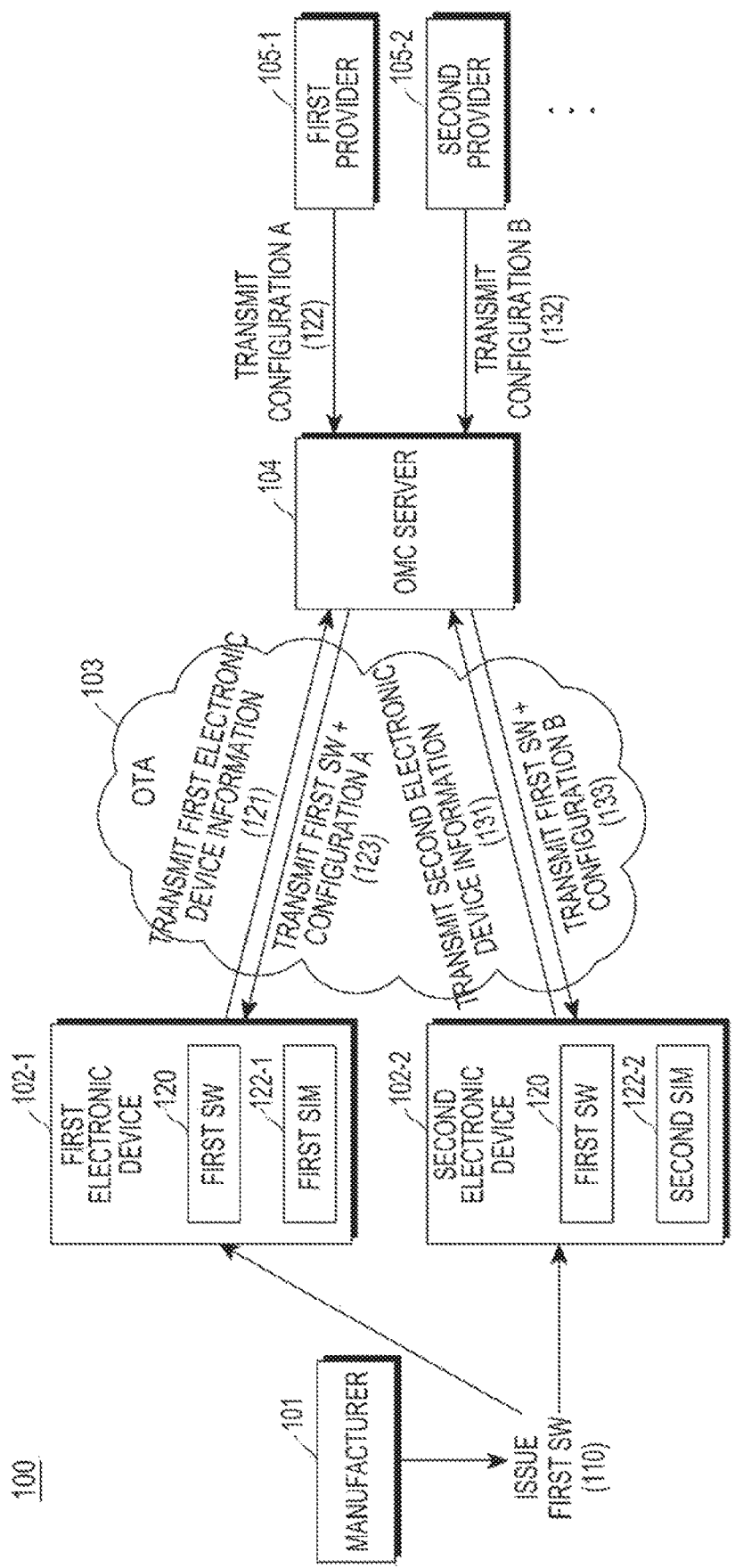
FIG. 1 illustrates an example of a configuration of a system for setting the software of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of the first user device and the second user device are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, eve the terms defined herein may not be construed to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or Internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device is not limited to the aforementioned devices, and may include a new electronic device according to the development of technology.

According to various embodiments of the present disclosure, information on the electronic device may contain a model name, software version information, international mobile station equipment identity (IMEI), or version information of an open market customization (OMC) package.

According to various embodiments of the present disclosure, providers may be communication network providers (or carriers) who provide communication services to the electronic device, providers who provide account services (e.g., Google), or other providers who provide a variety of services.

According to various embodiments of the present disclosure, the open market is a unit in which software is issued, and may include a unit that is separated depending on a specific region (e.g., countries (e.g., Republic of Korea or Southeast Asian countries) or confederation (e.g., European Union (EU)). For example, in the case where the manufacturer issues software for the open market for a specific region and installs the same in the electronic device, the electronic device installed with the software may be configured to operate in the corresponding region.

According to various embodiments of the present disclosure, the OMC package may include the software configuration customer software configuration (CSC) information that is required by the provider (e.g., a communication network provider (or a carrier) or a service provider), and may be a software configuration that is installed in the electronic device in order to apply files containing the information to the electronic device. In addition, the OMC package may be received by the electronic device through a communication network. For example, the software configuration information may contain function information to be set, information on applications or resources, which are to be downloaded and installed, or various pieces of information related to the software configuration required by the provider.

According to various embodiments of the present disclosure, the resources may include data to be applied to a specific function (e.g., a wallpaper setting function or a ring tone setting function), such as wallpaper or ringtones, which are required to be set in the electronic device by the provider.

An electronic device and a method for setting the software in the electronic device, according to various embodiments of the present disclosure, is described below with reference to the accompanying drawings. In the present disclosure, the term "user" may refer to a person who uses the electronic device or an apparatus that uses the electronic device (e.g., artificial intelligence electronic devices).

FIG. 1 illustrates an example of a configuration of a system for setting the software of an electronic device according to an embodiment of the present disclosure.

Referring to FIG. 1, the system 100 may include a manufacturer 101, one or more electronic devices (e.g., the first electronic device 102-1, the second electronic device 102-2 . . . ), an OMC server 104, or one or more providers (e.g., the first provider 105-1, the second provider 105-2 . . . ).

According to various embodiments of the present disclosure, the communication system 100 may use a setting method (customization) through over the air (OTA) in order to set the software configuration, and information that is related to the software configuration required by the one or more providers (e.g., the first provider 105-1, the second provider 105-2 . . . ) may be transmitted to the one or more electronic devices (e.g., the first electronic device 102-1, the second electronic device 102-2 . . . ) through various communication networks.

The manufacturer 101 may produce one or more electronic devices (e.g., the first electronic device 102-1, the second electronic device 102-2 . . . ). For example, the manufacturer 101 may issue default software (e.g., the first software (SW) 120), and may install the default software in the electronic device manufactured by the manufacturer 101.

The one or more electronic devices may contain the default software. For example, the default software may be issued for the open market when manufacturing the electronic device 120, and may be implemented to enable communication in a specific region.

The first electronic device 102-1 may adopt the first subscriber identity module (SIM) 102-1, which is inserted in order to use a communication network that is provided by the first provider 105-1. The second electronic device 102-2 may adopt the second SIM 102-2, which is inserted in order to use a communication network that is provided by the second provider 105-2.

The OMC server 104 may receive, from one or more providers (e.g., the first provider 105-1, the second provider 105-2 . . . ), configuration information that is related to the software installed in the electronic device, and may manage the same.

According to various embodiments of the present disclosure, in operation 101, the manufacturer 101 may issue the first SW 120 to then be installed in the electronic device.

In operation 121, the first electronic device 102-1 may identify the first SIM 122-1 that is inserted therein, and if information on the first SIM 122-1 is not registered in the OMC server 104, may transmit the information on the first SIM 122-1 to the OMC server 104 via a network 103.

In operation 122, the OMC server 104 may receive configuration information (e.g., configuration 'A'), which is related to the first SIM 122-1, from the first provider 105-1.

In operation 123, the OMC server 104 may transmit the configuration information 'A' on the first SIM to the first electronic device 102-1. For example, the first electronic device 102-1 may receive the configuration information, via the OMC server 104, from the first provider 105-1 who provides the communication service through the first SIM 122-1.

According to various embodiments of the present disclosure, when the first electronic device 102-1 receives the configuration information 'A,' the first electronic device 102-1 may apply the configuration information 'A' to the first SW 120.

In operation 131, the second electronic device 102-2 may identify the second SIM 122-2 that is inserted therein, and if information on the second SIM 122-2 is not registered in the OMC server 104, may transmit the information on the second SIM 122-2 to the OMC server 104.

In operation 132, the OMC server 104 may receive the configuration information (e.g., configuration 'B') on the second SIM 122-2 from the second provider 105-2.

In operation 133, the OMC server 104 may transmit the configuration information 'B' on the first SIM 122-2 to the second electronic device 102-2. For example, the second electronic device 102-2 may receive the configuration information, via the OMC server 104, from the second provider 105-2 who provides the communication service through the second SIM 122-2.

According to various embodiments of the present disclosure, when the second electronic device 102-2 receives the configuration information 'B,' the second electronic device 102-2 may apply the configuration information 'B' to the first SW 120.

The electronic device (e.g., the OMC server 104), according to various embodiments of the present disclosure, may include a communication unit; and a processor that is configured to receive SIM information corresponding to a SIM, which is functionally connected with an external device, from the external device, and transmit, to the external device, configuration information that is related to one or more network providers corresponding to the SIM information such that the external device changes at least some of the software stored in the memory, which is functionally connected with the external device, or obtains other software.

The processor, according to various embodiments of the present disclosure, may be configured to receive, as at least some of the configuration information, setting information, software information, or resource information, which is provided by the one or more network providers.

The processor, according to various embodiments of the present disclosure, may be configured to store the records of the configuration information that is transmitted from the external device, or from the external device and other external devices in the memory that is functionally connected with the electronic device.

The processor, according to various embodiments of the present disclosure, may be configured to transmit a message that contains a notification corresponding to the configuration information to the external device when a response related to the transmitted configuration information is not received within a predetermined time.

The processor, according to various embodiments of the present disclosure, may be configured to transmit a message related to the update of the configuration information to the external device when the update of the configuration information is identified.

Figure 2:
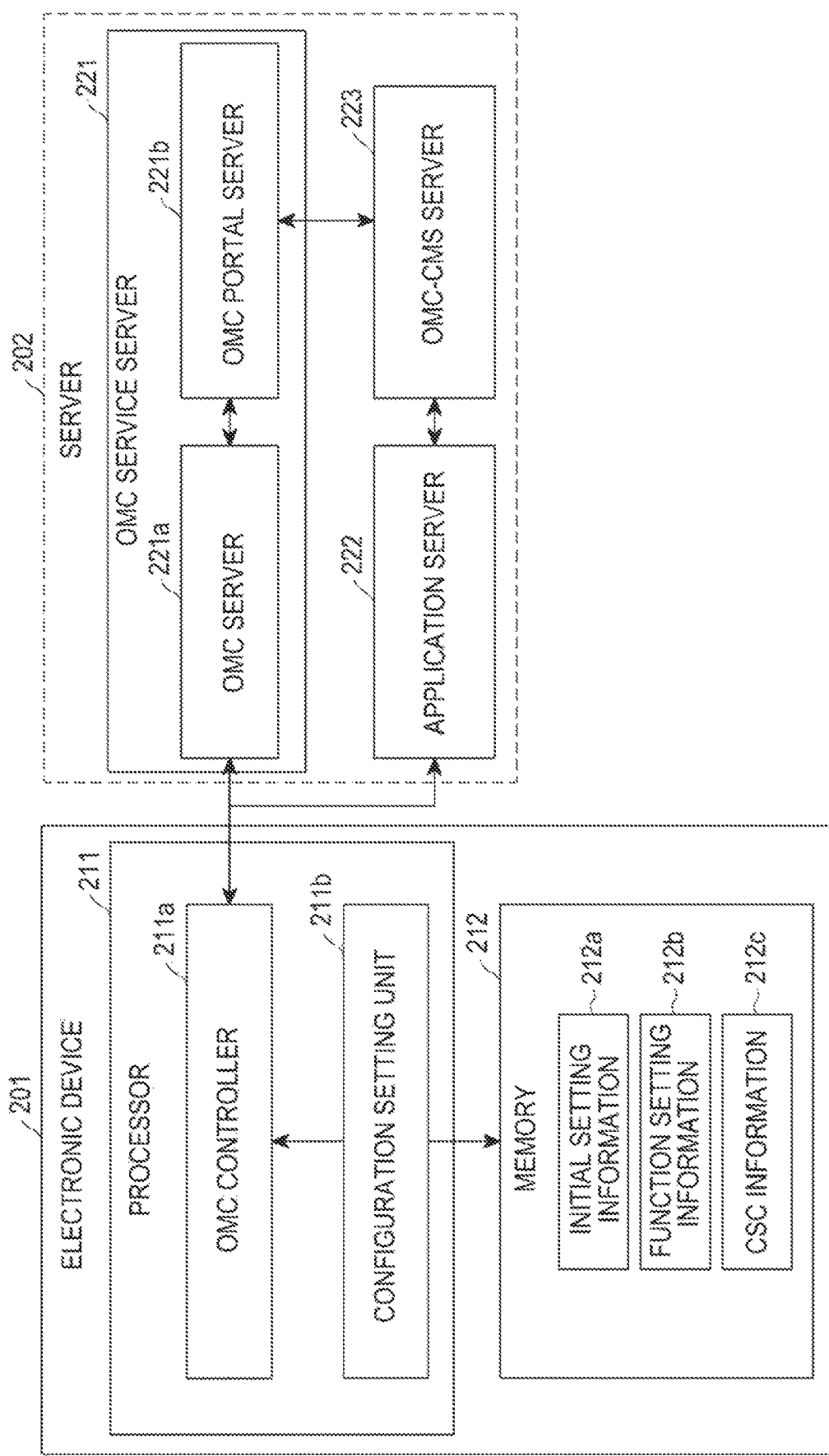
FIG. 2 illustrates an example of a configuration of a communication system for setting the software of an electronic device according to an embodiment of the present disclosure.

FIG. 2 illustrates an example of a configuration of a communication system for setting the software of an electronic device according to an embodiment of the present disclosure.

Referring to FIG. 2, the communication system may include an electronic device 201 and a server 202.

The electronic device 201 may include a processor 211 or a memory 212.

The processor 211 may include an OMC controller 211a or a configuration setting unit 211b.

According to various embodiments of the present disclosure, the processor 211 may provide the user interaction for outputting information related to the software configuration, a user interface (UI) for receiving a user input, or various OMC services for applying the software, which is issued for the open market, to the electronic device 201.

The OMC controller 211a may perform various operations for using the OMC services. For example, the OMC controller 211a may control to register the electronic device 201 in the server 202, download the configuration related to the software of the electronic device 201 or applications, and update the user interaction or a trigger.

The configuration setting unit 211b may perform an operation for setting the software configuration for each provider. For example, when the operation of updating specific software configuration is triggered, the configuration setting unit 211b may identify update information on each function of the software.

According to various embodiments of the present disclosure, the configuration setting unit 211b may identify the information related to the software configuration, which is stored in the memory 212, and may add the update information on each function to the stored configuration information (preloaded CSC) in order to thereby update the software configuration. For example, the update information may be transmitted to the electronic device 201 through the OTA.

The memory 212 may store initial setting information 212a on the software, which is set by the manufacturer, function setting information 212b that contains setting information for each function of the software, or CSC information 212c that contains the software configuration information.

The server 202 may include an OMC service server 221, an application server 222, or an OMC—(configuration management system (CMS) server 223.

According to various embodiments of the present disclosure, although the OMC service server 221, the application server 222, and the OMC-CMS server 223 are illustrated to be separated elements, at least one of the elements may be omitted or modified, and the elements may operate as a single server according to the agreement between the provider and the manufacturer.

According to various embodiments of the present disclosure, the server 202 may identify the status in which applications or resources are downloaded for each electronic device or each provider, or according to the type of SIM. For example, the server 202 may make a request to the OMC-CMS server 223 for the status information.

The OMC service server 221 may include an OMC server 221a or an OMC portal server 221b.

According to various embodiments of the present disclosure, the OMC service server 221 may perform overall operations for providing the electronic device 201 with a package (e.g., an OMC package), which contains the software configuration information. For example, the OMC service server 221 may manage the distribution and service of the OMC package for each model or each SIM, or may perform the release, the verification, the determination of installation, the distribution, or the stop of the distribution of the configuration information.

The OMC server 221a may transmit the software configuration to the electronic device 201. For example, the OMC server 221a, which is a manufacturer server of the electronic device 201, may receive information related to the software configuration to then be transmitted to the electronic device 201.

The OMC portal server 221b may manage user accounts, the software configuration registered in the corresponding user account, a cycle of the software configuration, or may control the operation of receiving and transmitting the software configuration. For example, the OMC portal server 221b may be connected to a server (or a storage server or an external server) of the provider (e.g., a communication network provider) in order to thereby manage the information related to the software configuration, which is required by the provider, for each user account through the communication network.

According to various embodiments of the present disclosure, although the OMC server 221a and the OMC portal server 221b are illustrated to be separate elements, they may operate as a single server according to the agreement between the provider and the manufacturer.

The application server 222 may provide services that are related to the applications or resources. For example, the application server 222 may provide services that are related to the download and installation of a specific application or resource in order to thereby install the application or resource in the electronic device 201.

According to various embodiments of the present disclosure, the application server 222 may be connected with servers of various service providers in order to thereby manage applications that are related to the provider. For example, the applications may include manufacturer applications (e.g., Samsung applications), service applications (e.g., Google applications), and sponsored applications related to business (e.g., Facebook).

According to various embodiments of the present disclosure, the application server 222 may identify policy information that is related to a specific application or resource. For example, the policy information may be set in relation to the download and installation, and may contain information on the applications or resources, which can be installed mandatorily or optionally.

The OMC-CMS server 223 may create the OMC package based on the information received from the communication network provider (e.g., a mobile network operator (MNO)), and may manage and control the software configuration related to the OMC package. For example, the manufacturer may identify the information on the management and control of the software configuration, which is received from the OMC-CMS server 223, in order to thereby use the same for subsequent operations, such as software development, analysis, or design.

According to various embodiments of the present disclosure, the OMC-CMS server 223 may control to transmit the software configuration information to the electronic device 201 through the communication network.

The OMC-CMS server 223 may be connected to the manufacturer server (e.g., the OMC server 221*a*) and may identify the demands of the manufacturer in order to thereby create and manage the OMC package.

According to various embodiments of the present disclosure, the server 222 may manage installation information for each electronic device (e.g., the electronic device 201). For example, the installation information may contain information on whether a software configuration file has been installed (e.g., completion of installation or failure of installation) or information on installed resources or applications among the resources or applications that are contained in the OMC package.

According to various embodiments of the present disclosure, the electronic device (e.g., the electronic device 201) may install the OMC package, and may report the installation information on the installed OMC package to the server 222, and the server 222 may identify the reported installation information in order to thereby manage the installation information on the OMC package for each electronic device.

Figure 3:
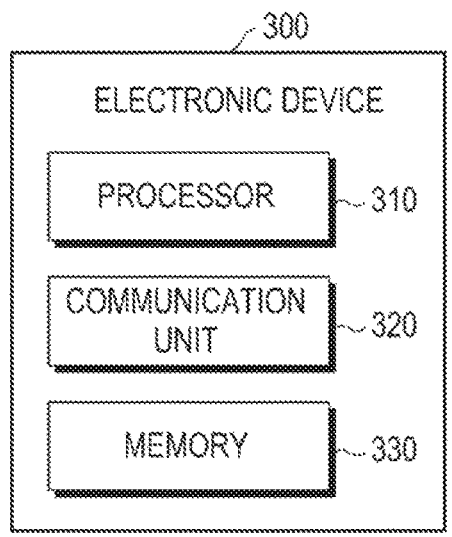
FIG. 3 illustrates an example of a configuration of an electronic device for setting the software according to an embodiment of the present disclosure.

FIG. 3 illustrates an example of a configuration of the electronic device for setting the software according to an embodiment of the present disclosure.

Referring to FIG. 3, the electronic device 300 may include a processor 310, a communication unit 320, or a memory 330.

The processor 310 may control various OMC services to apply the software, which is issued for the open market, to the electronic device 300. For example, the processor 310 may register the electronic device 300 in the OMC server, and may control to download the software configuration or applications.

According to various embodiments of the present disclosure, the processor 310 may set the software configuration for each provider, or may identify the information (e.g., the OMC package) on the software configuration that is stored in the memory 212 in order to thereby update the software configuration for one or more SIMs (or one or more providers).

According to various embodiments of the present disclosure, the processor 310 may control to apply the software configuration information contained in the OMC package to the electronic device 300 according to the insertion state of the SIM (e.g., the change of the SIM or the insertion of a plurality of SIM/public land mobile networks (PLMNs)).

According to various embodiments of the present disclosure, when a plurality of SIMs are inserted, the processor 310 may identify the information on the OMC package that is applicable to the plurality of SIMs, and may control to apply the identified OMC package to the electronic device 300. For example, the processor 310 may identify package information that is applicable to each of the plurality of SIMs, and may change some features the OMC package, which has been previously applied, or may change the OMC package to a new OMC package, and to then be applied to the electronic device 300.

According to various embodiments of the present disclosure, when a plurality of SIMs are inserted, the processor 310 may apply the first OMC package for the first SIM, which is inserted first, to the electronic device 300, and then may apply the second OMC package for the second SIM, which is inserted next, to the electronic device 300. For example, when a plurality of SIMs are inserted, the software configuration contained in the first OMC package may be applied to the electronic device 300, and after the applications or resources are downloaded, the software configuration contained in the second OMC package may be applied to the electronic device 300.

According to various embodiments of the present disclosure, if the inserted SIM is changed from the previously inserted SIM, the processor 310 may identify the OMC package information on the changed SIM through a server (e.g., the OMC service server 221), and may apply the identified OMC package to the electronic device 300. For example, if the OMC package information on the changed SIM is not stored memory 300, the processor 310 may control to receive the OMC package from the server.

The memory 300 may store the setting information for the default software that is configured by the manufacturer or the configuration information created by the server. For example, the configuration information may contain information for setting a specific function of the electronic device 300 or information on the applications or resources to be downloaded.

The electronic device, according to various embodiments of the present disclosure, may include a communication unit; a memory; and a processor that is configured to identify SIM information corresponding to a SIM, which is functionally connected with the electronic device, transmit the SIM information to an external device through the communication unit, receive configuration information related to one or more network providers corresponding to the SIM information through the communication unit, and change at least some of the software stored in the memory or obtain other software based on at least some of the configuration information.

The processor, according to various embodiments of the present disclosure, may be configured to receive, as at least some of the configuration information, setting information, software information, or resource information, which is provided by the one or more network providers.

The processor, according to various embodiments of the present disclosure, may be configured to receive, as at least some of the software information or the resource information, installation policy information or download server information, and change at least some of the software or obtain other software by using the installation policy information or the download server information.

The processor, according to various embodiments of the present disclosure, may be configured to display a user interface for receiving a user input through a display that is functionally connected with the electronic device in relation to the software that is changed at least in part or other software that is obtained.

The processor, according to various embodiments of the present disclosure, may be configured to transmit a request for additional information that is related to at least some of the configuration information to the external device based on at least some of the user input.

The processor, according to various embodiments of the present disclosure, may be configured to receive the additional information from the external device, and change at least some of the software or obtain other software based on the additional information.

The processor, according to various embodiments of the present disclosure, may be configured to receive information on the other software or resource information from one or more servers that are different from the external device by using route information that is contained in the additional information.

The processor, according to various embodiments of the present disclosure, may be configured to identify the SIM information, and if the identified SIM information corresponds to a predetermined SIM state, determine that the configuration information has been updated.

The processor, according to various embodiments of the present disclosure, may be configured to, receive the updated configuration information when it is determined that the configuration information has been updated, and change at least some of the software or obtain other software based on at least some of the updated configuration information.

Figure 4:
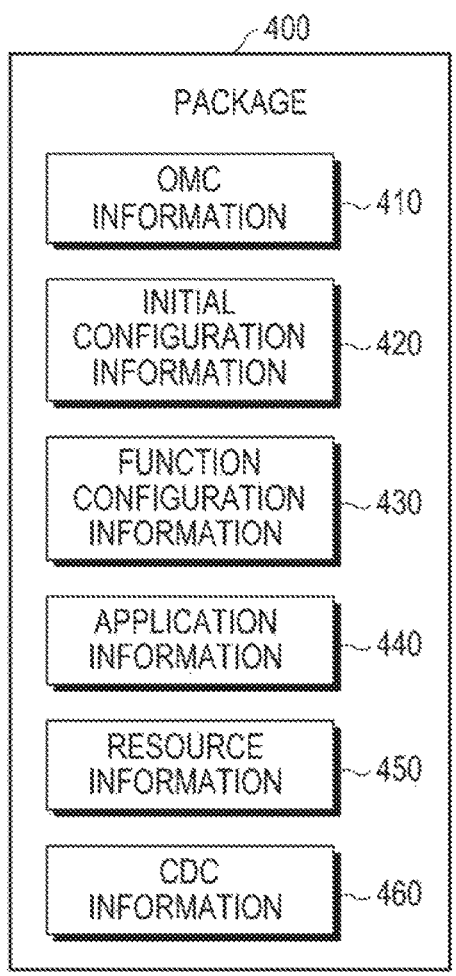
FIG. 4 is a block diagram showing an example of a configuration of the software according to an embodiment of the present disclosure.

FIG. 4 is a block diagram showing an example of a configuration of the software according to an embodiment of the present disclosure.

Referring to FIG. 4, the OMC package 400 may contain at least one of OMC information 410, initial setting information 420, function information 430, application information 440, resource information 450, or content download configuration (CDC) information 460, and may further contain a variety of information for downloading and installing information related to the OMC.

According to various embodiments of the present disclosure, the OMC package 400 may be stored in the form of a compressed file (e.g., ".zip") in order to be a minimum size for downloading and installing the information related to the OMC.

According to various embodiments of the present disclosure, each element of the OMC package 400 (e.g., the OMC information 410, the initial setting information 420, the function information 430, the application information 440, the resource information 450, or the CDC information 460) may be stored in the form of an extensible markup language (XML) file.

The OMC information 410 (e.g., "omc.info") may contain the information related to the OMC package. For example, the information related to the OMC package may contain version information or model information on the corresponding package.

The initial setting information 420 (e.g., "customer.xml") may contain information that is related to an initial setting operation in the electronic device. For example, the initial setting information 420 may be utilized when updating an operating system as well.

The function information 430 (e.g., "others.xml") may contain configuration value information on the features required to be identified with respect to a specific operation when the specific operation is executed in the electronic device.

The application information 440 (e.g., "apps.xml") may contain information that is related to the application to be downloaded. For example, the information related to the application may contain information on the server from which the corresponding application is downloaded, configuration value information necessary for the installation, or information on the installation type (e.g., mandatory or optional installation).

The resource information 450 (e.g., "resource.xml") may contain information that is related to the resource to be downloaded. For example, the information related to the resource may contain information on the server from which the corresponding resource is downloaded, configuration value information necessary for the installation, or information on the mandatory or optional installation of the resource in the electronic device.

According to various embodiments of the present disclosure, the electronic device may download the applications or resources through a plurality of servers. For example, with regard to the applications or resources, which are downloaded from a plurality of servers, the application information 440 or the resource information 450 may contain billing process information or access uniform resource locator (URL) information about each of the download servers.

The CDC information 660 may contain the configuration information for downloading content (e.g., the applications or resources). For example, the CDC information 660 may contain bearer information to be used for the download, server information for the download, download mechanism information, and content information to be downloaded (e.g., a content list, names, description, the access URL, or the installation type (e.g., mandatory or optional installation)).

According to various embodiments of the present disclosure, the CDC information 660 may be created when the OMC package 400 is created. In addition, the CDC information 660 may be converted into a format that is defined in the electronic device in which the package 400 is installed, and the converted CDC information may be identified in order to thereby perform various operations for setting the software configuration in the corresponding electronic device.

According to various embodiments of the present disclosure, although the application information 440, the resource information 450, and the CDC information 660 are illustrated to be separated, at least some of the CDC information 660 may be contained in the application data 440 or the resource information 450, and in this case, the CDC information 660 may be omitted.

Figure 5:
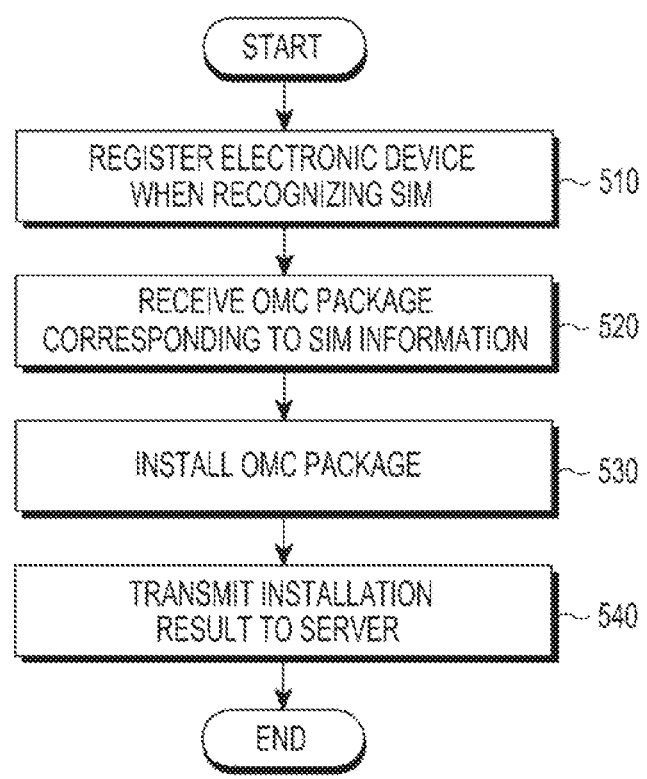
FIG. 5 is a flowchart illustrating an example of the operation of setting the software in the electronic device according to an embodiment of the present disclosure.

FIG. 5 is a flowchart illustrating an example of the operation of setting the software in the electronic device according to an embodiment of the present disclosure.

Referring to FIG. 5, in operation 510, the electronic device may register the electronic device in the server upon the recognition of the SIM. For example, the server may include a server that creates or transmits the OMC package.

According to various embodiments of the present disclosure, the electronic device may transmit the SIM information to the server in order to thereby register the electronic device in the server.

In operation 520, the electronic device may receive the OMC package corresponding to the SIM information. For example, the OMC package may contain the software configuration information required by the provider corresponding to the SIM.

In operation 530, the electronic device may download the received OMC package, and may install the same in the electronic device. For example, the electronic device may identify the configuration information contained in the OMC package, and may apply the configuration information to the software installed in the electronic device.

According to various embodiments of the present disclosure, the configuration information contained in the OMC package may contain customers. For example, the customers may be configured for each country or provider with respect to the functions of the electronic device, the applications, or the resources, and a specific function, application, or resource may be installed for the customer that is configured by the corresponding country or provider to then be operated.

In operation 540, the electronic device may send the installation result to the server.

The operating method of an electronic device, according to various embodiments of the present disclosure, may include identifying SIM information corresponding to a SIM, which is functionally connected with the electronic device; transmitting the SIM information to an external device, receiving configuration information related to one or more network providers corresponding to the SIM information, and changing at least some of the software that is stored in the memory that is functionally connected with the electronic device or obtaining other software based on at least some of the received configuration information.

The operating method of an electronic device, according to various embodiments of the present disclosure, may further include, in relation to the operation of changing at least some of the software or obtaining other software, displaying a user interface for receiving a user input through a display that is functionally connected with the electronic device.

The operating method of an electronic device, according to various embodiments of the present disclosure, may further include transmitting a request for additional information that is related to at least some of the configuration information to the external device based on at least some of the user input.

The operating method of an electronic device, according to various embodiments of the present disclosure, may further include receiving the additional information from the external device, and changing at least some of the software or obtaining other software based on the additional information.

The operating method of an electronic device, according to various embodiments of the present disclosure, may further include receiving information on the other software or resource information from one or more servers that are different from the external device by using route information that is contained in the additional information.

The operating method of an electronic device, according to various embodiments of the present disclosure, may further include identifying one or more pieces of software information or mandatory resource information, which is contained in the configuration information, and changing at least some of the software or obtaining other software based on at least some of one or more pieces of software information or mandatory resource information.

Figure 6:
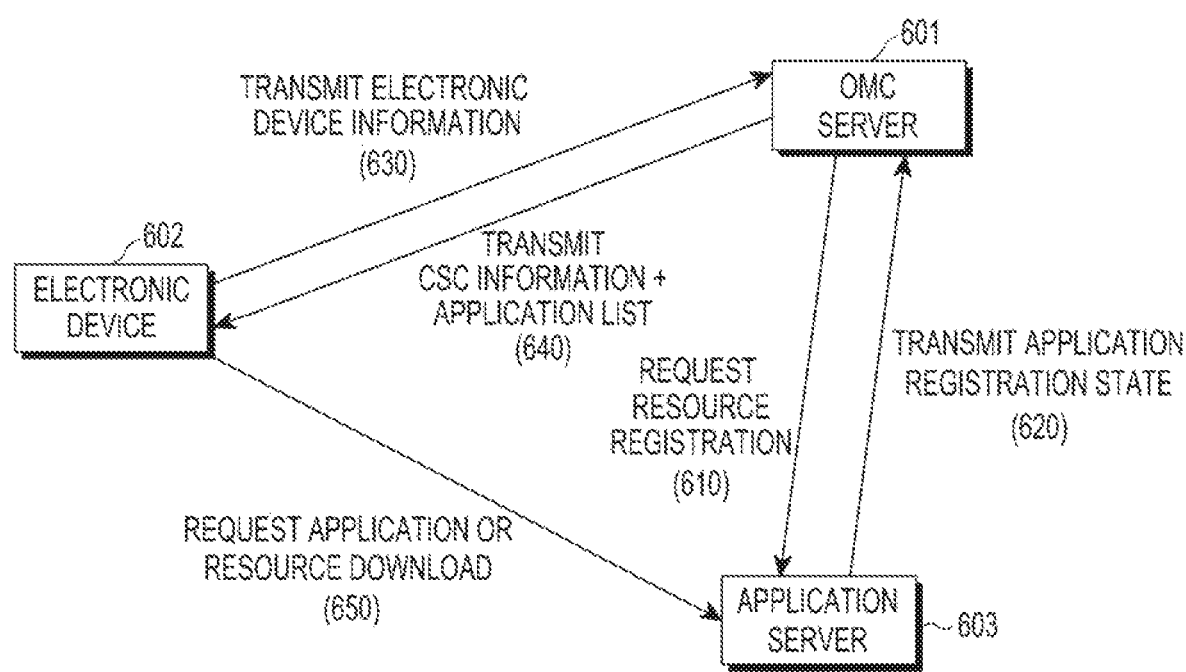
FIG. 6 illustrates an example of a system to support applications or resources between an electronic device and a server according to an embodiment of the present disclosure.

FIG. 6 illustrates an example of a system to support applications or resources between the electronic device and the server according to an embodiment of the present disclosure.

Referring to FIG. 6, the system 600 may include an OMC server 601, an electronic device 602, or an application server 603.

The OMC server 601 may include an OMC portal server (not shown) or an OMC front server (not shown).

The OMC portal server may set the CSC information or the application information, and may store resources or metadata. The OMC front server may deliver the configuration information required by the provider to the electronic device 602. For example, the CSC information may contain information that is related to functions, applications, or resources, which are required by the provider in relation to specific software or the electronic device.

According to various embodiments of the present disclosure, at least one of the OMC portal server or the OMC front server may be omitted, and in this case, the OMC server 601 may perform the operation of: requesting the resource registration; identifying the status of the application registration; managing the CSC information or the application information; and transmitting the same to the electronic device 602.

In operation 610, the OMC portal server 601a may make a request to the application server 603 for the resource registration.

In operation 620, the application server 603 may transmit the registration status of the application to the OMC portal server 601a in response to the resource registration. For example, the registration status of the application may contain information, such as a model name of the application, mobile country code (MCC), mobile network code (MNC), CSC, application identification (ID) information, or version code information.

In operation 630, the electronic device 602 may forward the information of the electronic device 602 to the OMC server 601. For example, the information of the electronic device 602 may contain SIM information.

In operation 640, the OMC portal server 601a may transmit the CSC information or the application list information to the OMC front server 601b. For example, the OMC server 601 may identify the received SIM information of the electronic device 602, and may transmit the CSC information or the application list information, which is required by the provider corresponding to the SIM, to the electronic device 202.

In operation 650, the electronic device 602 may make a request to the application server 203 for the download of the application or resource based on the received application list information.

According to various embodiments of the present disclosure, the application server 603 may transmit URL or file information for downloading the corresponding application or resource in response to the request of the electronic device 602.

Figure 7:
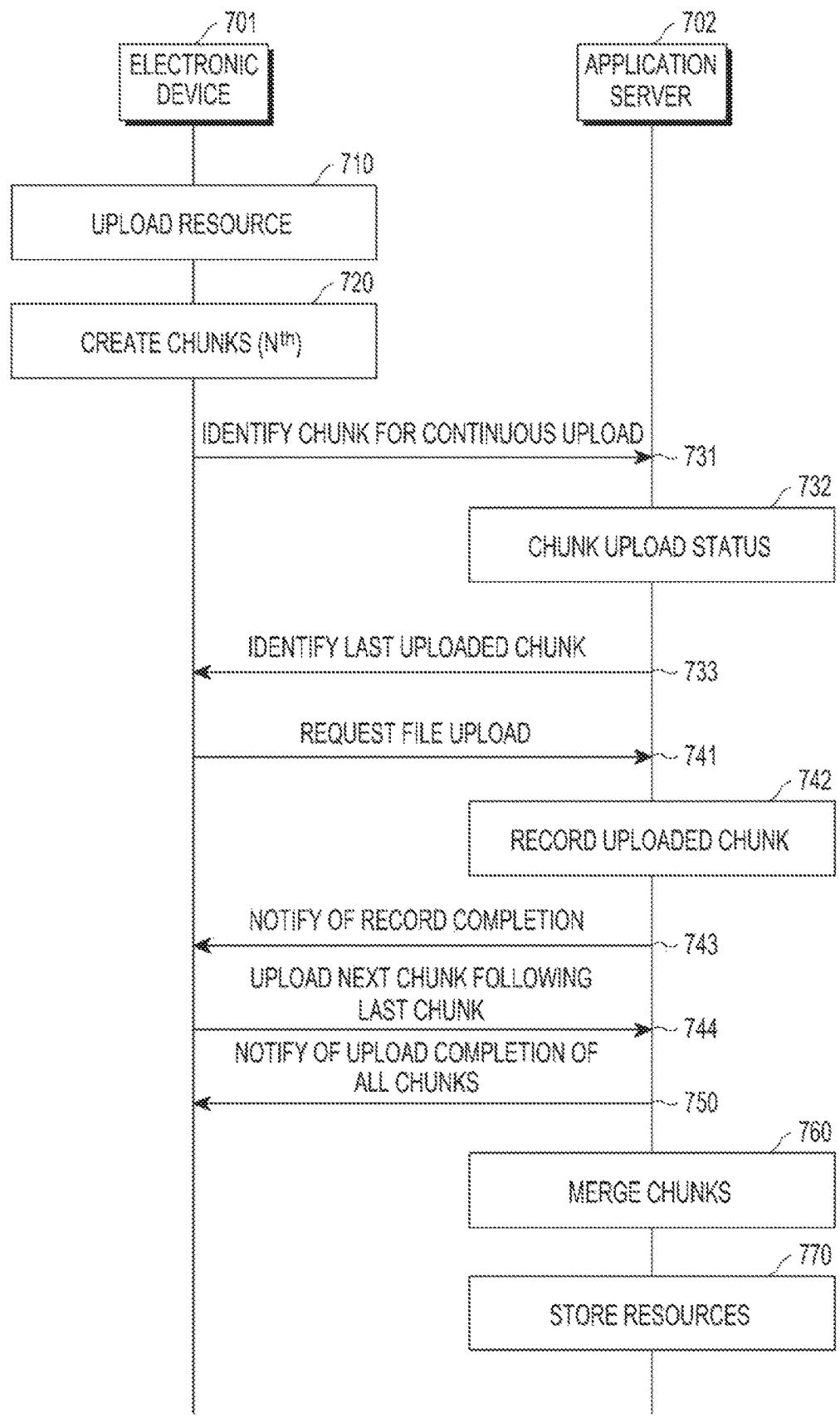
FIG. 7 is a flowchart illustrating an example of an operation to support applications or resources between an electronic device and a server according to an embodiment of the present disclosure.

FIG. 7 is a flowchart illustrating an example of an operation to support applications or resources between the electronic device and the server according to an embodiment of the present disclosure.

Referring to FIG. 7, in operation 710, the electronic device 701 may upload resources to a server (e.g., the application server 702).

In operation 720, the electronic device 701 may create chunks for the resources. For example, the created chunks may be given the identification number in order of the creation (Nth).

In operation 731, the electronic device 701 may make a request to the application server 702 for the confirmation on the next chunk in order to upload the same following the chunk that is previously uploaded.

In operation 732, the application server 702 may identify the status of the chunks that are previously uploaded.

In operation 733, the application server 702 may transmit information on the chunk that was last uploaded to the electronic device 701.

In operation 741, the electronic device 701 may upload files to the application server 702.

In operation 742, the application server 702 may identify the uploaded files, and may record the uploaded chunks.

In operation 743, the application server 702 may transmit information stating that the Nth chunk has been recorded to the electronic device 701.

In operation 744, the electronic device 701 may upload the next chunk following the record-completed chunk.

In operation 750, the application server 702 may inform the electronic device 702 that all chunks have been uploaded.

In operation 760, the application server 702 may merge the uploaded chunks.

In operation 770, the application server 702 may store the merged chunks as resources.

According to various embodiments of the present disclosure, the electronic device 701 may include a management server or a client server, and may include various server devices for managing the OMC package.

Figure 8:
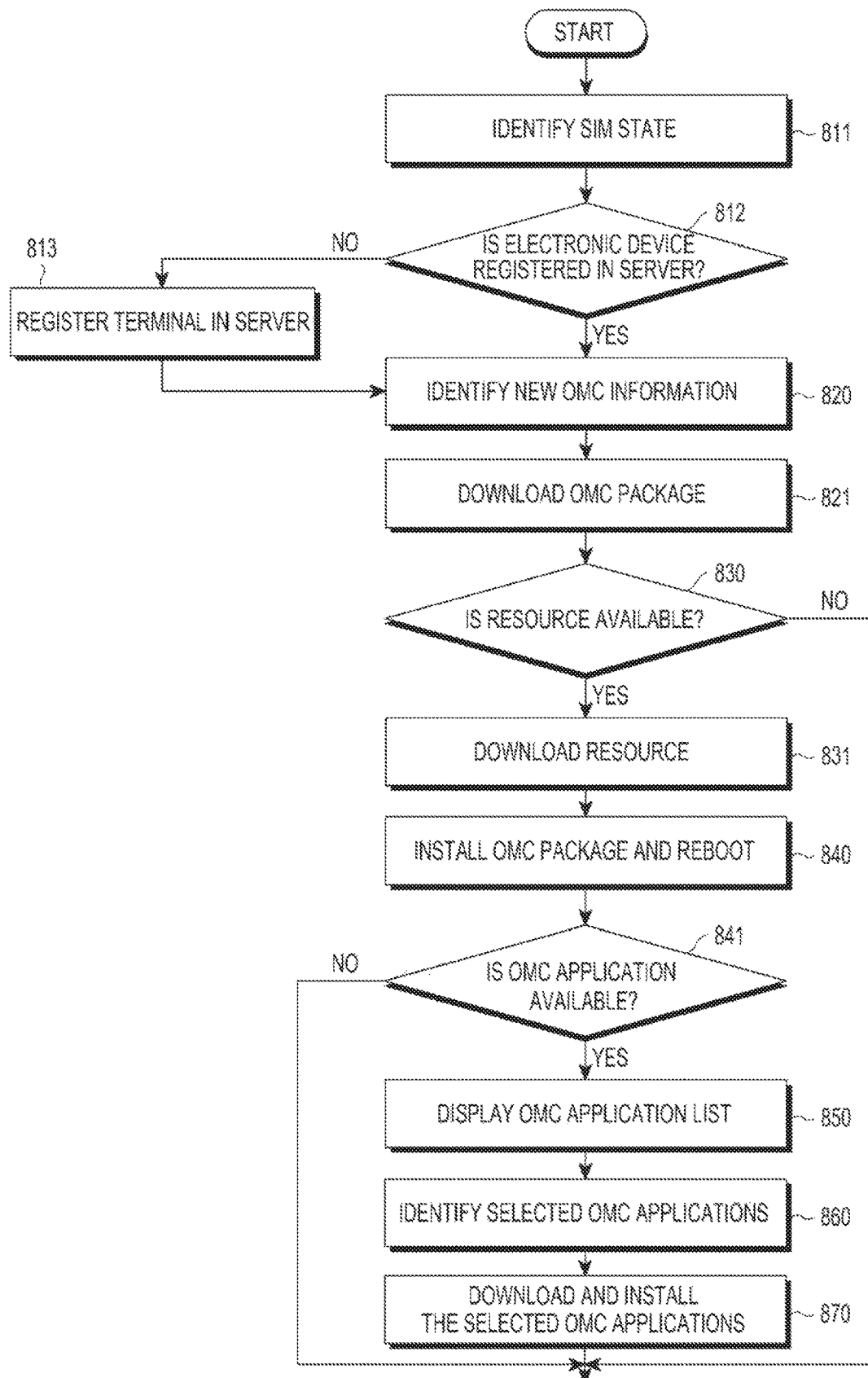
FIG. 8 is a flowchart illustrating an example of an operation of downloading an open market customization (OMC) package in the electronic device according to an embodiment of the present disclosure.

FIG. 8 is a flowchart illustrating an example of an operation of downloading the OMC package in the electronic device according to an embodiment of the present disclosure.

Referring to FIG. 8, the electronic device may check the status of the SIM in operation 811. For example, the status of the SIM may contain the insertion of the SIM into the electronic device, the removal of the SIM from the electronic device, or the changed state from the previously inserted SIM.

In operation 812, the electronic device may determine whether the electronic device is registered in the server. For example, the electronic device may identify whether information related to the SIM, which is inserted into the electronic device, is registered in the server.

If the electronic device is not registered in the server as a result of the execution of operation 812 above, the electronic device may transmit information related to the inserted SIM to the server in order to thereby register the electronic device in the server in operation 813.

If it is determined that the electronic device is registered in the server as a result of the execution of operation 812 or operation 813 above, the electronic device may identify new OMC information in operation 820. For example, the electronic device may make a request to the server, in which the information of the electronic device is registered, for the confirmation on whether new OMC information has been received.

In operation 821, the electronic device may download the OMC package based on the new OMC information that is identified. For example, the downloaded OMC package may be created by the server to be downloadable for the electronic device based on the new OMC information.

In operation 830, the electronic device may determine whether the resource contained in the downloaded OMC package is available.

If it is determined that the resource is available as a result of the execution of operation 830 above, the electronic device may download the resource contained in the downloaded OMC package in operation 831.

In operation 840, the electronic device may install the OMC package, and may control the electronic device to reboot.

In operation 841, the electronic device may determine whether the applications contained in the OMC package are executable in the electronic device.

If the application contained in the OMC package are executable in the electronic device as a result of the execution of operation 841, the electronic device may display a list of the applications that are contained in the OMC package in operation 850.

In operation 860, the electronic device may identify the application that is selected by the user from among the displayed application list.

In operation 870, the electronic device may download the OMC application that is selected by the user, and may install the same in the electronic device.

Figure 9:
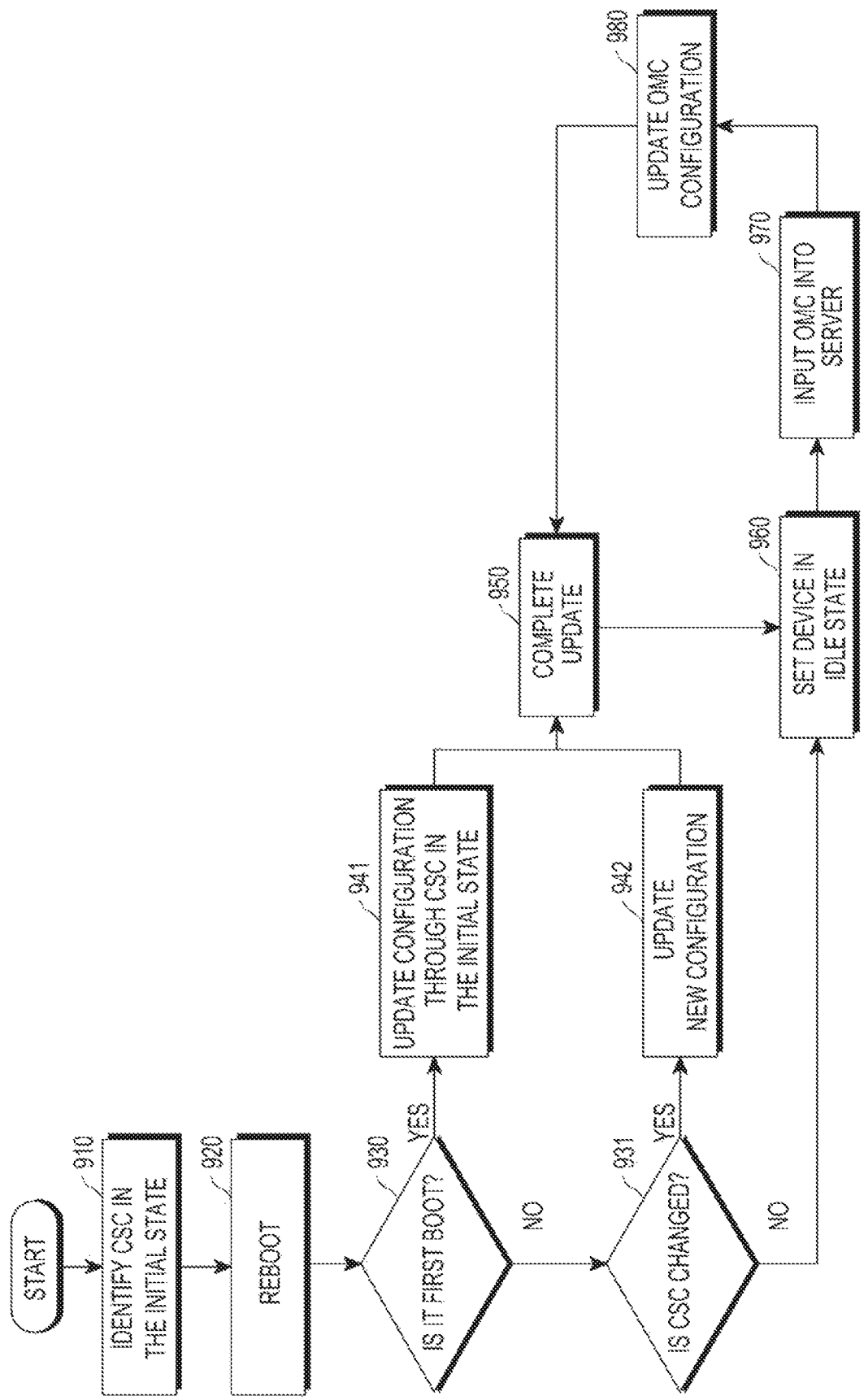
FIG. 9 is a flowchart illustrating an example of an operation of updating the software configuration in the electronic device according to an embodiment of the present disclosure.

FIG. 9 is a flowchart illustrating an example of an operation of updating the software configuration in the electronic device according to an embodiment of the present disclosure.

Referring to FIG. 9, in operation 910, the electronic device may identify the CSC information in the initialization state, and may apply the CSC information to the electronic device. For example, the CSC information in the initialization state may contain functions to be set in the initial state of the electronic device by the manufacturer, or application or resource information to be downloaded and installed.

In operation 920, the electronic device may reboot.

In operation 930, the electronic device may determine whether the reboot of operation 920 is the first reboot.

If the current reboot is not the first reboot as a result of the execution of operation 930, the electronic device may identify whether the identified CSC information has been changed in operation 931. For example, the electronic device may identify the changed CSC information by receiving a message notifying of the change in the CSC information from the server or by periodically polling the server.

If the current reboot is the first reboot as a result of the execution of operation 930, the electronic device may update the configuration information through the CSC in the initialization state in operation 941. For example, the electronic device may apply the software configuration for the first time through the CSC in the initialized state, and the electronic device may identify the OMC package in order to thereby apply the identified OMC package to the electronic device.

If the CSC information has been changed in the current reboot state as a result of the execution of operation 931, the electronic device may update new configuration information in operation 942. For example, the new configuration information may contain the CSC information that is identified to be updated by the electronic device.

In operation 950, the electronic device may complete the update for the new configuration information. For example, when the changed CSC information is downloaded and installed, the electronic device may complete the update operation.

According to various embodiments of the present disclosure, the changed CSC information may be made by changing all or some of the software configuration files, and the electronic device may update the CSC information, which has been changed as a whole or in part. For example, the operation of updating the CSC information may include operations of adding the information, which has been changed at least in part, to the existing CSC information, or changing or deleting at least some of the existing CSC information.

If no changed CSC information is identified as a result of the execution of operation 931, or if the update is completed as a result of the execution of operation 950, the electronic device may be configured to be in the idle state in operation 960. For example, in the idle state, the electronic device may: be in the standby mode in which the electronic device does not perform any operation; output a home screen; or be in the locked mode.

In operation 970, the electronic device may inform the server that the changed CSC information has been updated.

According to various embodiments of the present disclosure, the electronic device may configure a period in which the electronic device informs of the update of the CSC information. For example, the configured period may be received from the server when receiving the OMC package previously, and the electronic device may make a request to the server that has transmitted the period for a new version of OMC package when the configured period expires.

In operation 980, the electronic device may identify that the OMC configuration information is updated in the server. For example, when the electronic device receives an acknowledgment from the server, the electronic device may determine that the changed CSC information is reflected in the server.

If the acknowledgment is received from the server as a result of the execution of operation 980 above, the electronic device may determine that the update operation is completed in operation 950.

Figure 10:
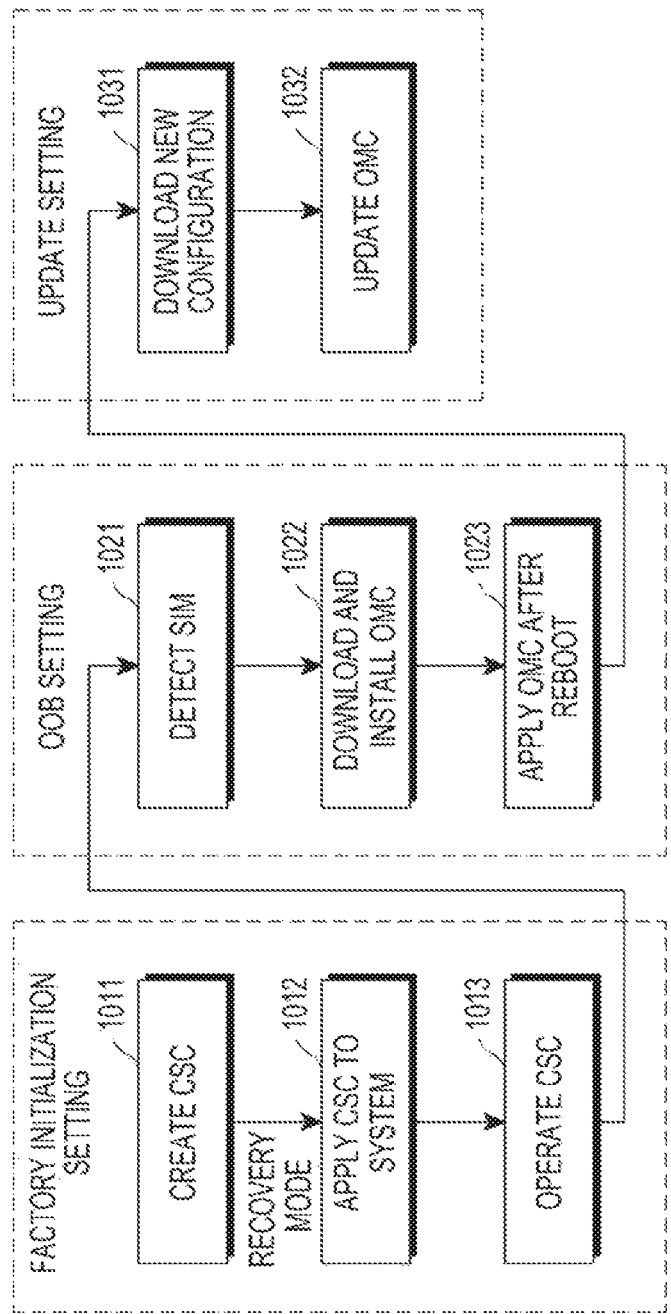
FIG. 10 is a flowchart illustrating an example of an operation of setting the software configuration in the electronic device according to an embodiment of the present disclosure.

FIG. 10 is a flowchart illustrating an example of an operation of setting the software configuration in the electronic device according to an embodiment of the present disclosure.

Referring to FIG. 10, the electronic device may set the software in the factory-initialized state.

In operation 1011, the electronic device may identify the initial CSC. For example, the initial CSC may be created for the open market by the manufacturer, and may contain the software configuration information required by the provider.

In operation 1012, the electronic device may apply one or more CSCs to the system. For example, the applied CSC may contain the initial CSC or the CSC information that is updated afterwards.

According to various embodiments of the present disclosure, when applying the created CSC, the electronic device may activate a recovery mode.

In operation 1013, the electronic device may operate the applied CSC. For example, the electronic device may identify the function information that is contained in the CSC (e.g., "others.xml"), and may apply a value corresponding to the function information to a specific function in order to thereby operate the same.

According to various embodiments of the present disclosure, the electronic device may identify the detailed configuration information in the out of box (OOB) state. For example, the OOB state may contain the state in which the electronic device is activated for use by inserting the SIM for the first time, or in which the electronic device is registered in the server and the initial configuration is identified.

In operation 1021, the electronic device may detect the SIM that is insert into the electronic device while the initial booting operation. For example, when the electronic device accesses the server for the first time, the electronic device may transmit information on the SIM to the server, and may receive an acknowledgment from the server in order to thereby register the electronic device.

According to various embodiments of the present disclosure, the SIM information may contain at least one of MCC, MNC, mobile subscription identification number (MSIN), mobile station international subscriber directory number (MSISDN), electronic serial number (ESN), an integrated circuit card identifier (ICCID), a service provider name (SPN), a group identifier (GID), or the international mobile subscriber identity (IMSI). For example, the electronic device may identify at least one piece of information that is contained in the SIM in order to thereby identify that the SIM has been inserted into the electronic device.

In operation 1022, the electronic device may apply the OMC (e.g., the OMC package). For example, the OMC may contain initial setting information that is set by the manufacturer of the electronic device.

According to various embodiments of the present disclosure, the electronic device may download a new OMC through the OTA. For example, as the new OMC is downloaded, the initial setting information (e.g., "customer.xml") or the functional information (e.g., "others.xml") may be replaced by the information contained in the downloaded OMC.

According to various embodiments of the present disclosure, an application, which is required to be newly installed by the provider in relation to the applied OMC, may be identified. For example, if an installation request for the corresponding application is received from the user, the identified application may be installed.

In operation 1023, the electronic device may apply the OMC to the electronic device. For example, in order to apply the OMC to the electronic device, the electronic device may control to reboot.

According to various embodiments of the present disclosure, when the initial OMC is applied, the electronic device may perform the update for the OMC.

In operation 1031, the electronic device may identify whether there is a new configuration for the software.

In operation 1032, the electronic device may update the OMC based on the new identified configuration. For example, with regard to the updated OMC, the initial setting information (e.g., "customer.xml") or the functional information (e.g., "others.xml") in the configuration information applied to the electronic device may be replaced with the information contained in the updated OMC.

Figure 11:
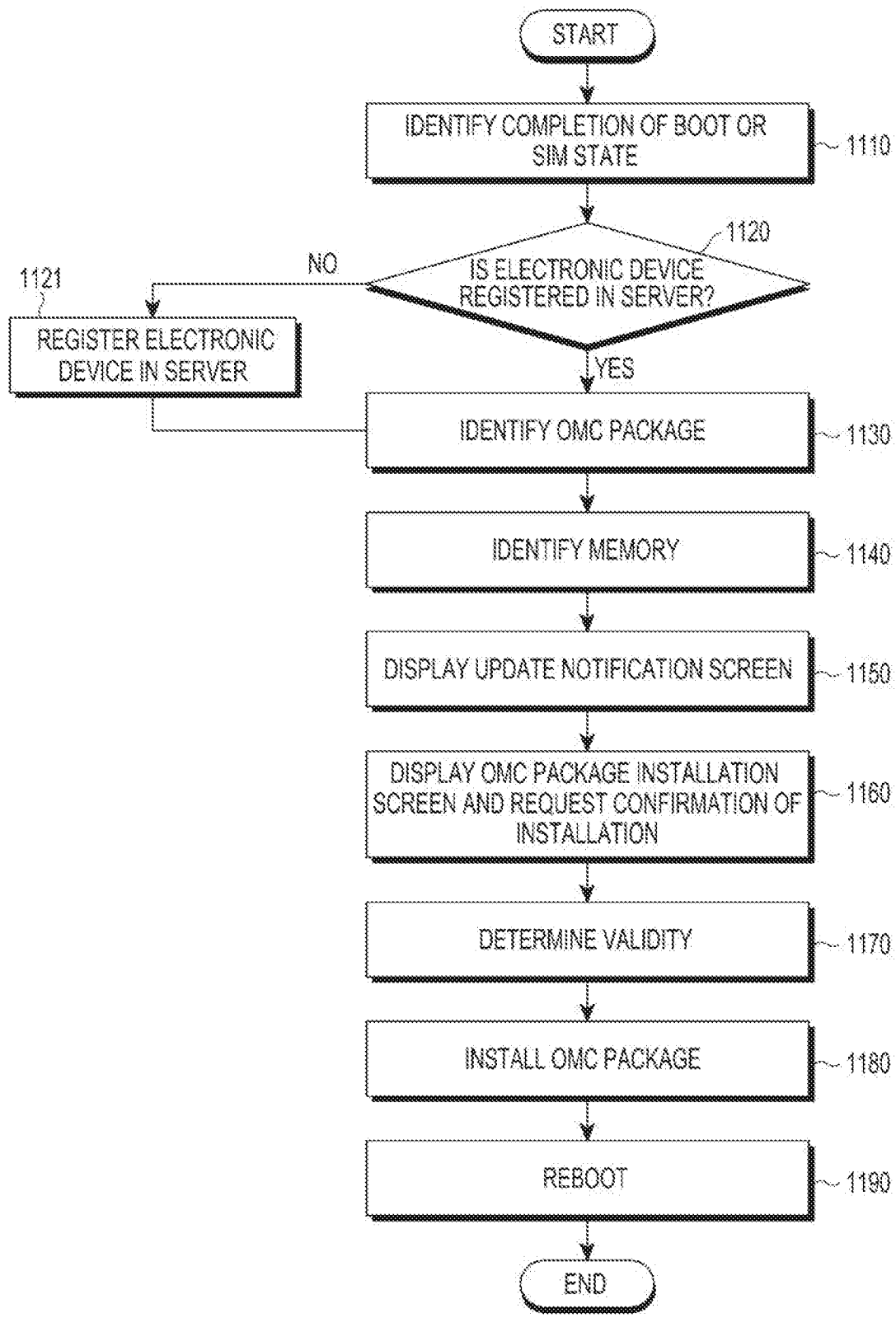
FIG. 11 is a flowchart illustrating an example of an operation of setting the software configuration in the electronic device according to an embodiment of the present disclosure.

FIG. 11 is a flowchart illustrating an example of an operation of setting the software configuration in the electronic device according to an embodiment of the present disclosure.

Referring to FIG. 11, in operation 1110, when the booting operation is completed, the electronic device may identify the state of the SIM. For example, the state of the SIM may include the insertion state or the changed state thereof.

In operation 1120, the electronic device may determine whether the electronic device has been registered in the server.

If it is determined that the electronic device has not been registered in the server as a result of operation 1120, the electronic device may control to register the information on the electronic device in the server in operation 1121.

If it is determined that the electronic device has been registered in the server as a result of operation 1120 or operation 1121, the electronic device may identify the OMC package in operation 1130.

According to various embodiments of the present disclosure, the OMC package may contain the configuration information to be set in relation to the software of the electronic device, which is received from the server.

In operation 1140, based on the information contained in the OMC package, the electronic device may: download wallpaper; determine the validity of the OMC package; or identify the memory space for the OMC package to be downloaded.

In operation 1150, the electronic device may display an update notification screen that informs of the update of the applications or resources related to the OMC package.

In operation 1160, the electronic device may display an OMC package installation screen that informs that the OMC package is to be installed, and may request the installation confirmation of the OMC package. For example, the electronic device may display a screen that requires the confirmation on the installation of the OMC package, and may receive the installation confirmation of the OMC package based on the user response.

In operation 1170, the electronic device may determine the validity of the OMC package. For example, the electronic device may determine whether the OMC package is related to the communication network provider of the electronic device or to the electronic device.

In operation 1180, the electronic device may install the OMC package.

In operation 1190, the electronic device may control to reboot. For example, when the OMC package is installed, the software configuration may be applied to the electronic device, and in the case of the electronic device to which the software configuration can be applied without the rebooting operation, the operation 1190 may be omitted.

Figure 12:
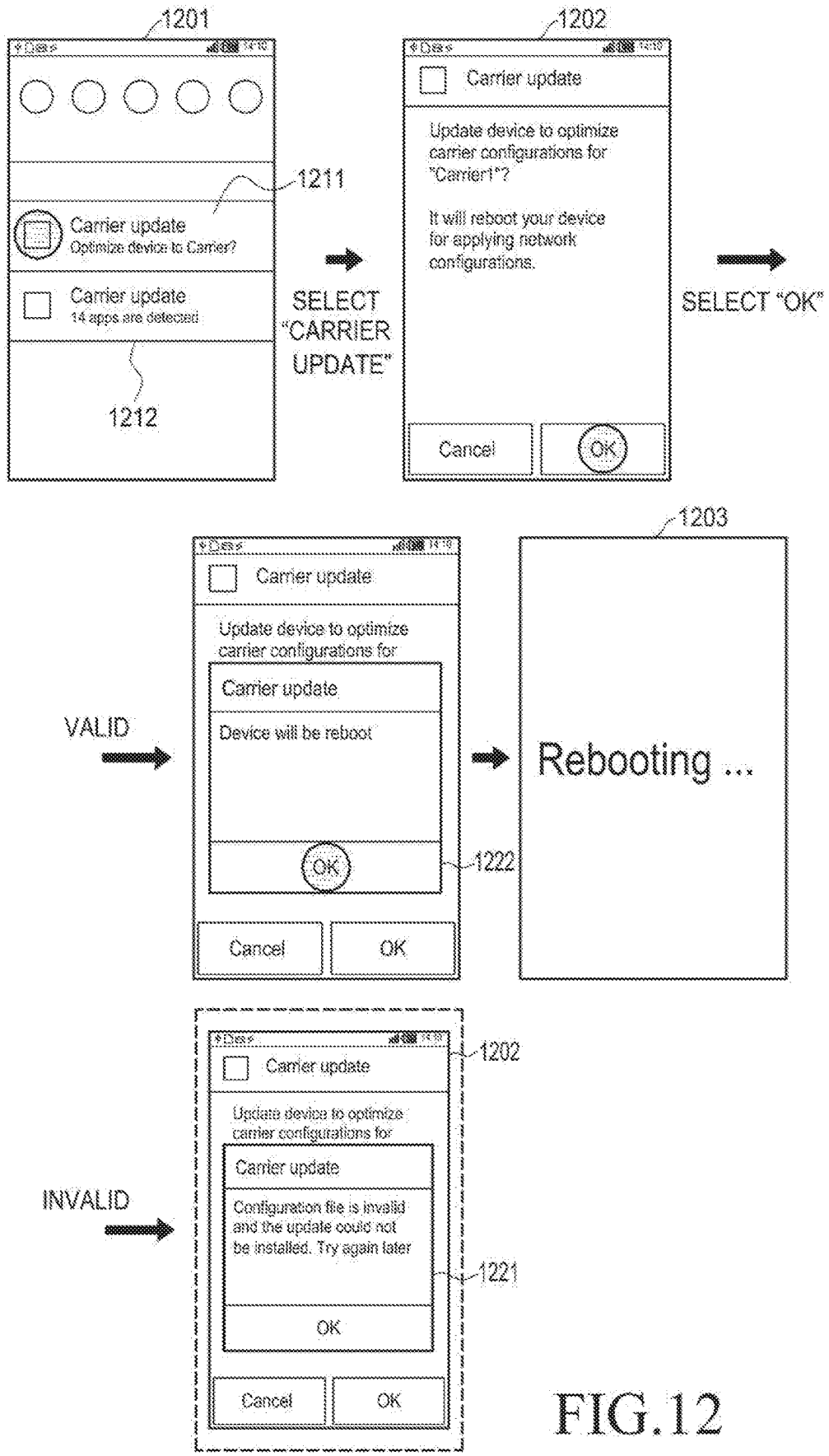
FIG. 12 illustrates an example of a screen configuration for setting the software configuration in the electronic device according to an embodiment of the present disclosure.

FIG. 12 illustrates an example of a screen configuration for setting the software configuration in the electronic device according to an embodiment of the present disclosure.

Referring to FIG. 12, when the electronic device identifies the update information for the OMC package, the electronic device may display an update notification screen 1201.

According to various embodiments of the present disclosure, the update notification screen 1201 may contain information that informs that new update for the OMC package of a specific communication network provider (e.g., "carrier1") is available or may contain one or more selection items for selecting an item to execute the update from among the new update items. For example, the selection items may include a first item 1211 that contains information that asks if the user will update the configuration related to a specific function (e.g., "optimize device to carrier?") or a second item 1212 that contains information that informs of the updated applications (e.g., "14 apps are detected").

According to various embodiments of the present disclosure, if the user selects "carrier update," the electronic device may display a screen 1202 that requests the confirmation of the installation of the update related to the selected "carrier update."

If the confirmation (e.g., "OK") is selected in the installation confirmation request screen 1202, the electronic device may determine the validity of the OMC package.

According to various embodiments of the present disclosure, if the OMC package is determined to be invalid, the electronic device may display a screen 1221 that informs that the update is impossible because of the invalidity of the OMC package, and may terminate the operation of setting the software configuration.

According to various embodiments of the present disclosure, if the OMC package is determined to be valid, the electronic device may update the OMC package, and may display a screen 1222 stating that the electronic device is rebooting.

If the user selects the confirmation (e.g., "OK") in the screen 1222 to inform of the reboot, the electronic device may reboot while displaying a rebooting screen 1203.

Figure 13:
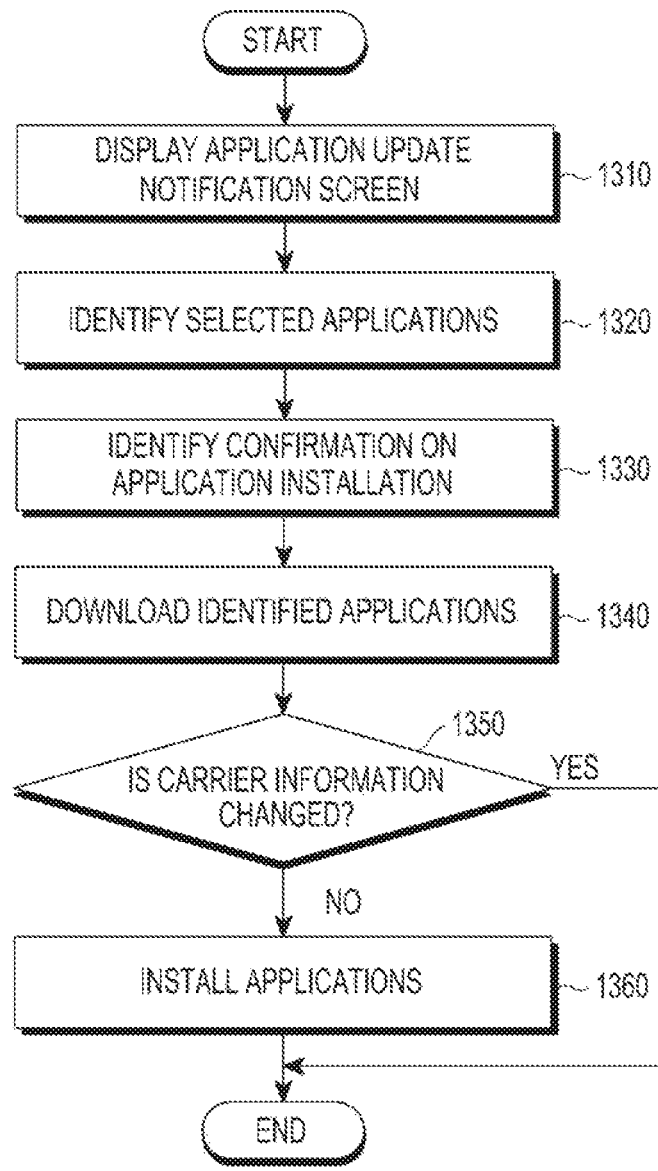
FIG. 13 is a flowchart illustrating an example of an operation of updating the software configuration in the electronic device according to an embodiment of the present disclosure.

FIG. 13 is a flowchart illustrating an example of an operation of updating the software configuration in the electronic device according to an embodiment of the present disclosure.

Referring to FIG. 13, in operation 1310, the electronic device may display an application update notification screen that contains a list of applications that are available for the update in relation to the received OMC package.

In operation 1320, the electronic device may identify applications that are selected by the user from among the application list.

In operation 1330, the electronic device may determine whether the user agrees to install the selected applications. For example, the electronic device may display information asking if the user agrees with the installation of the selected applications, and may receive a response to the displayed information in order to thereby determine whether the user agrees to install the applications.

In operation 1340, the electronic device may download the applications that the user has agreed to install.

In operation 1350, the electronic device may determine whether carrier information related to the next loaded OMC package has been changed.

If the OMC package has not been changed as a result of the execution of operation 1350, the electronic device may install the downloaded applications in operation 1360.

Figure 14:
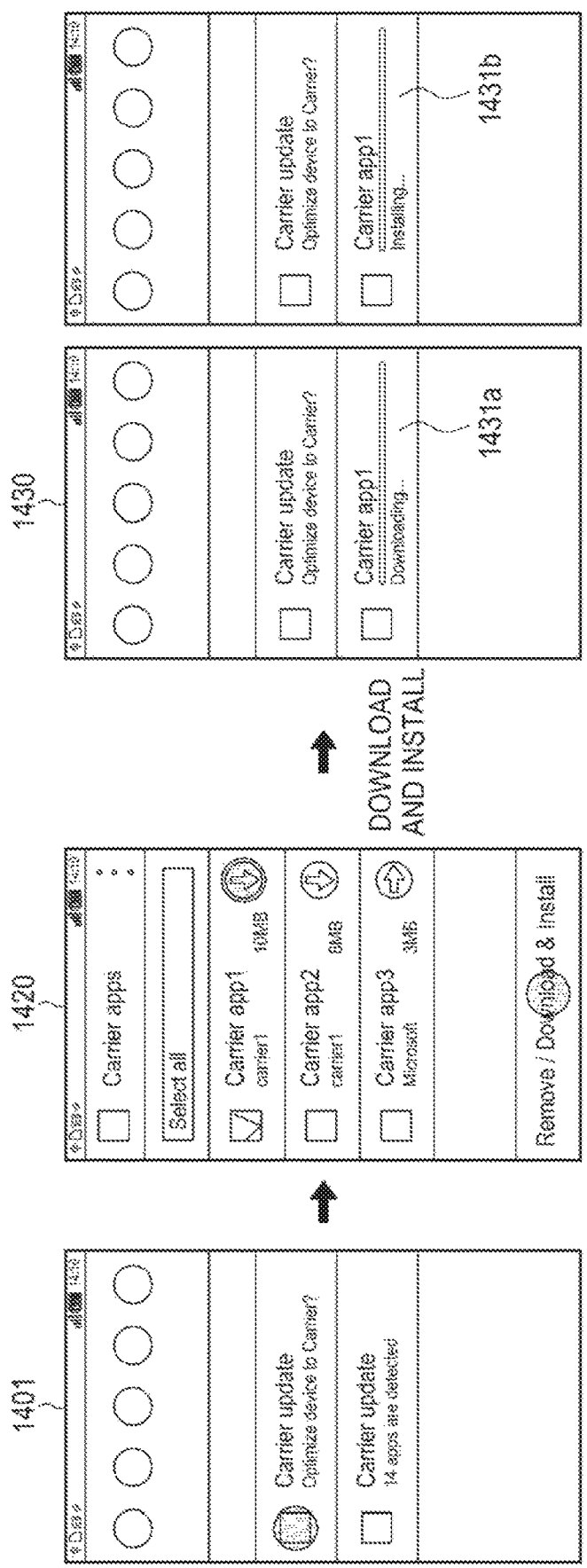
FIG. 14 illustrates an example of a screen configuration for updating the software configuration in the electronic device according to an embodiment of the present disclosure.

FIG. 14 illustrates an example of a screen configuration for updating the software configuration in the electronic device according to an embodiment of the present disclosure.

Referring to FIG. 14, if the update information for the OMC package is identified, the electronic device may display an update notification screen 1401.

According to various embodiments of the present disclosure, the update notification screen 1401 may contain information informing a user that a new update for the OMC package of a specific communication network provider (e.g., "carrier1") is available or one or more selection items for selecting an item to execute the update from among the new update items. For example, the selection items may include a first item that contains information that asks if the user will update the configuration related to a specific function (e.g., "optimize device to carrier?") or a second item that contains information informs of the updated applications (e.g., "14 apps are detected").

If the second item is selected, the electronic device may output a screen 1420 that displays a list of the updated applications. For example, the user may select one or more items from the application list.

According to various embodiments of the present disclosure, the electronic device may display a screen 1430 for downloading and installing the application that is selected by the user (e.g., 'carrier app 1').

According to various embodiments of the present disclosure, the electronic device may execute the download and installation of the selected application (e.g., 'carrier app1'), and may display the status of the execution through the screen 1430 for the download and installation. For example, the screen 1430 for the download and installation may display the status of the application download 1431a and the status of the application installation 1431b.

Figure 15A:
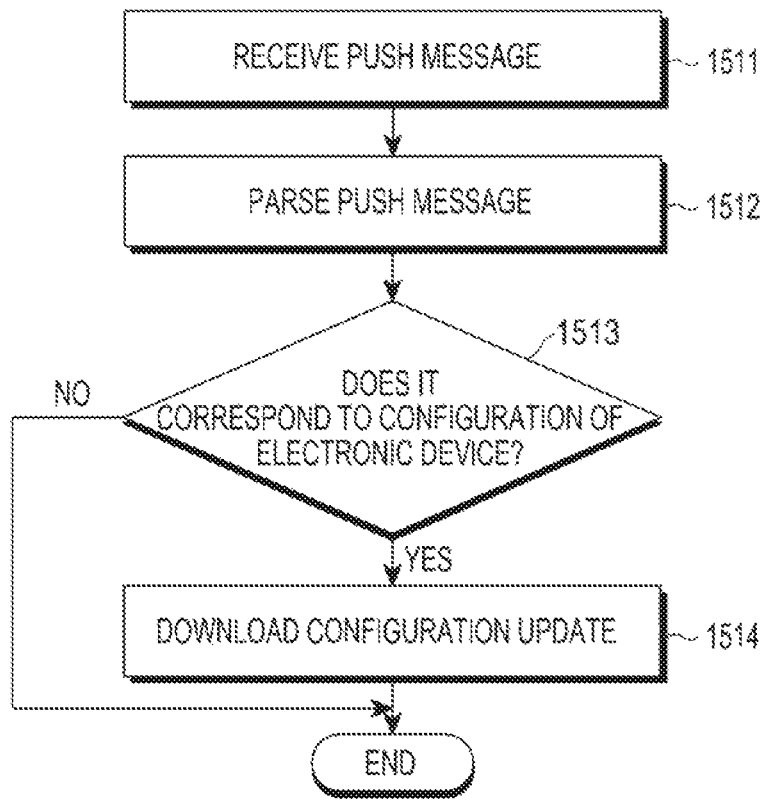
FIGS. 15A to 15C are flowcharts showing an example of an operation for updating a software configuration file according to various embodiments of the present disclosure.
Figure 15B:
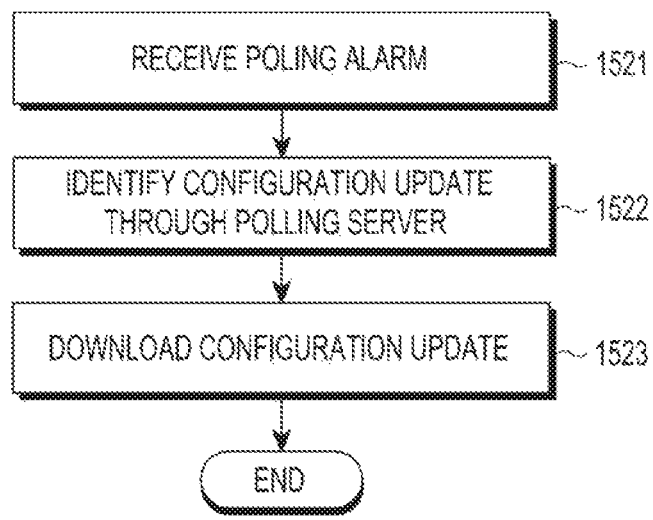
Figure 15C:
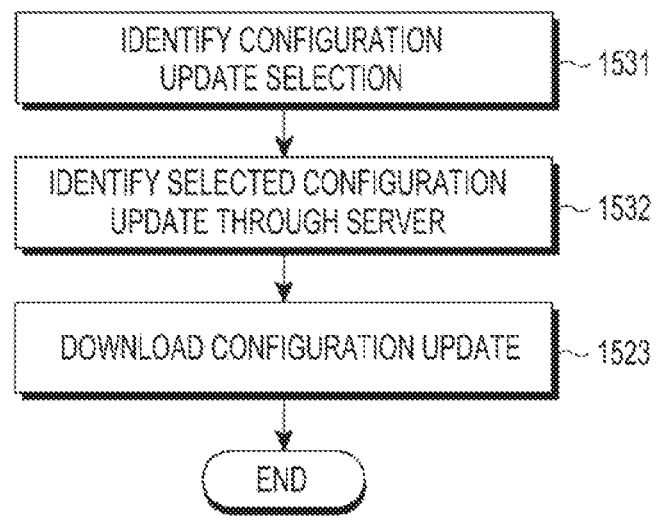

FIGS. 15A to 15C are flowcharts showing an example of an operation for updating a software configuration file according to various embodiments of the present disclosure.

Referring to FIGS. 15A-15C, if push messages or polling notifications are received, or if the execution of the update for the system or the carrier is identified, the electronic device may determine that the software configuration has been updated, and may download the same in the electronic device.

Referring to FIG. 15A, in operation 1511, the electronic device may receive a push message.

In operation 1512, the electronic device may parse the received push message.

In operation 1513, the electronic device may determine whether the received push message corresponds to the configuration of the electronic device based on the parsing result of the push message. For example, the electronic device may identify carrier information in the push message, and may compare the identified carrier information with the communication information of the electronic device in order to thereby determine whether the received push message corresponds to the configuration of the electronic device.

If the parsed push message corresponds to the software of the electronic device as a result of the execution of operation 1513, the electronic device may download the updated configuration in operation 1514.

Referring to FIG. 15B, in operation 1521, the electronic device may receive a polling notification. For example, the polling notification may be transmitted, in sequence, to the corresponding electronic device by the server, and a message stating that the software configuration of the electronic device is to be updated may be transmitted in a specific sequence.

In operation 1522, the electronic device may identify whether the software configuration has been updated through a polling server that transmits the polling notification.

In operation 1523, the electronic device may download the updated configuration. For example, the electronic device may determine that the software configuration has been updated through the polling server in order to thereby download the updated configuration.

Referring to FIG. 15C, in operation 1531, the electronic device may determine whether one or more of the updated software configurations have been selected in relation to a specific system or carrier. For example, the electronic device may display a list of the updated software configurations, and the user may select one or more software configurations to be updated through the list.

In operation 1532, the electronic device may identify the software configuration that is updated through the corresponding system or a server of the carrier.

In operation 1533, the electronic device may download the updated configuration.

According to various embodiments of the present disclosure, the electronic device may apply the downloaded configuration to the electronic device in order to thereby set one of the functions, applications, or resources of the electronic device.

Figure 16:
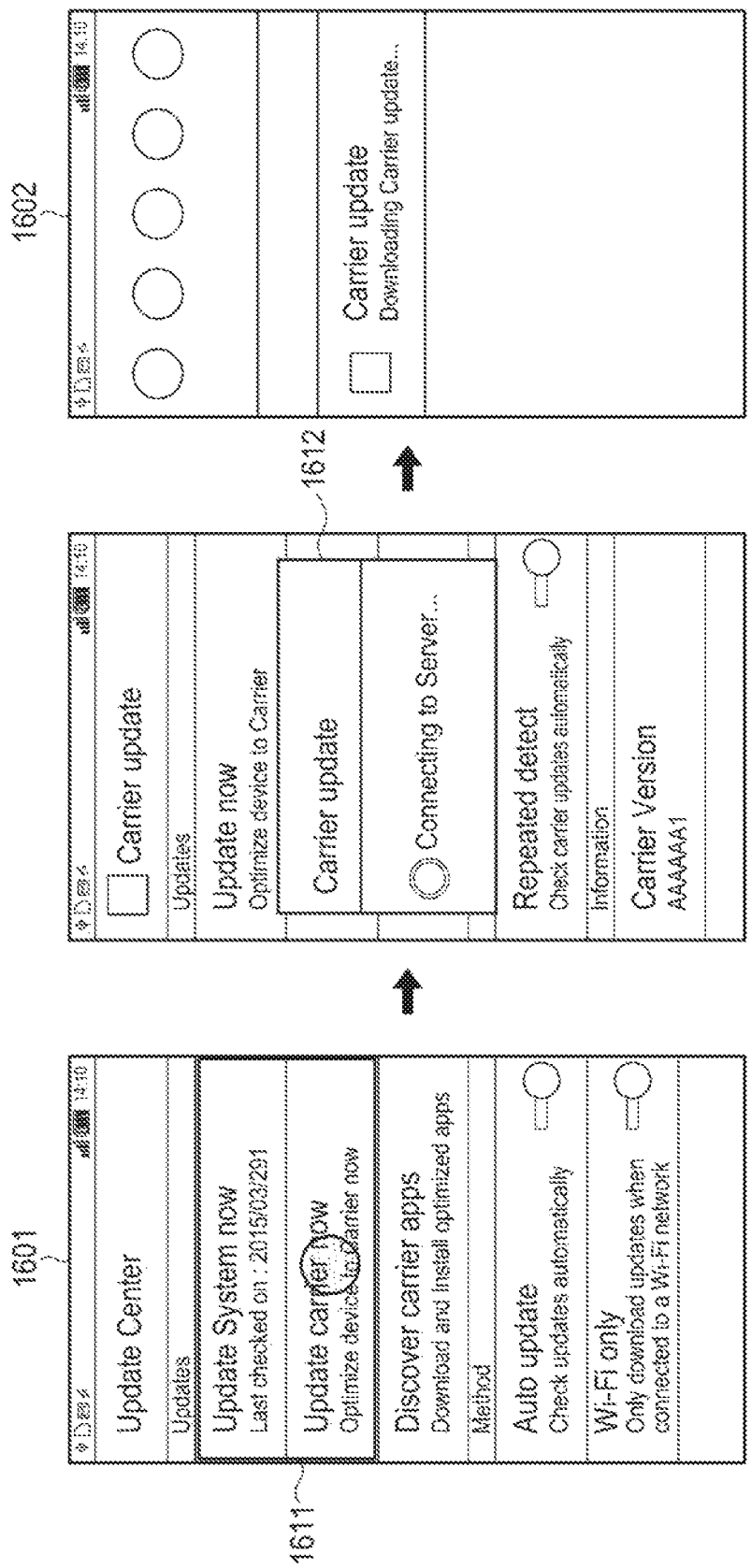
FIG. 16 illustrates an example of a screen configuration for updating the software configuration according to the user's selection according to an embodiment of the present disclosure.

FIG. 16 illustrates an example of a screen configuration for updating the software configuration according to the user's selection according to an embodiment of the present disclosure.

Referring to FIG. 16, if the update information on the software configuration is identified, the electronic device may display a notification screen 1601 showing that the update is available.

According to various embodiments of the present disclosure, the update notification screen 1601 may display information on the system, the carrier, or the applications, which can be updated with respect to the software configuration. For example, the update notification screen 1601 may include a selection item for updating the configuration related to the system (e.g., "update system now"), a selection item 1611 for updating the configuration related to the carrier (e.g., "update carrier now"), or a selection item for downloading and installing the update-available applications (e.g., "discover carrier apps"). The selection items may display a variety of forms and content.

According to various embodiments of the present disclosure, if the user selects the item 1611 in order to update the configuration related to the carrier, the electronic device may access a server that is related to the carrier, and may display a screen 1612 showing that the electronic device is in connection with the server.

According to various embodiments of the present disclosure, the electronic device may access the server in order to identify the updated configuration, and may display a screen 1602 that contains a list of the configurations that are available for the update regarding a specific carrier, based on the identified result.

Figure 17:
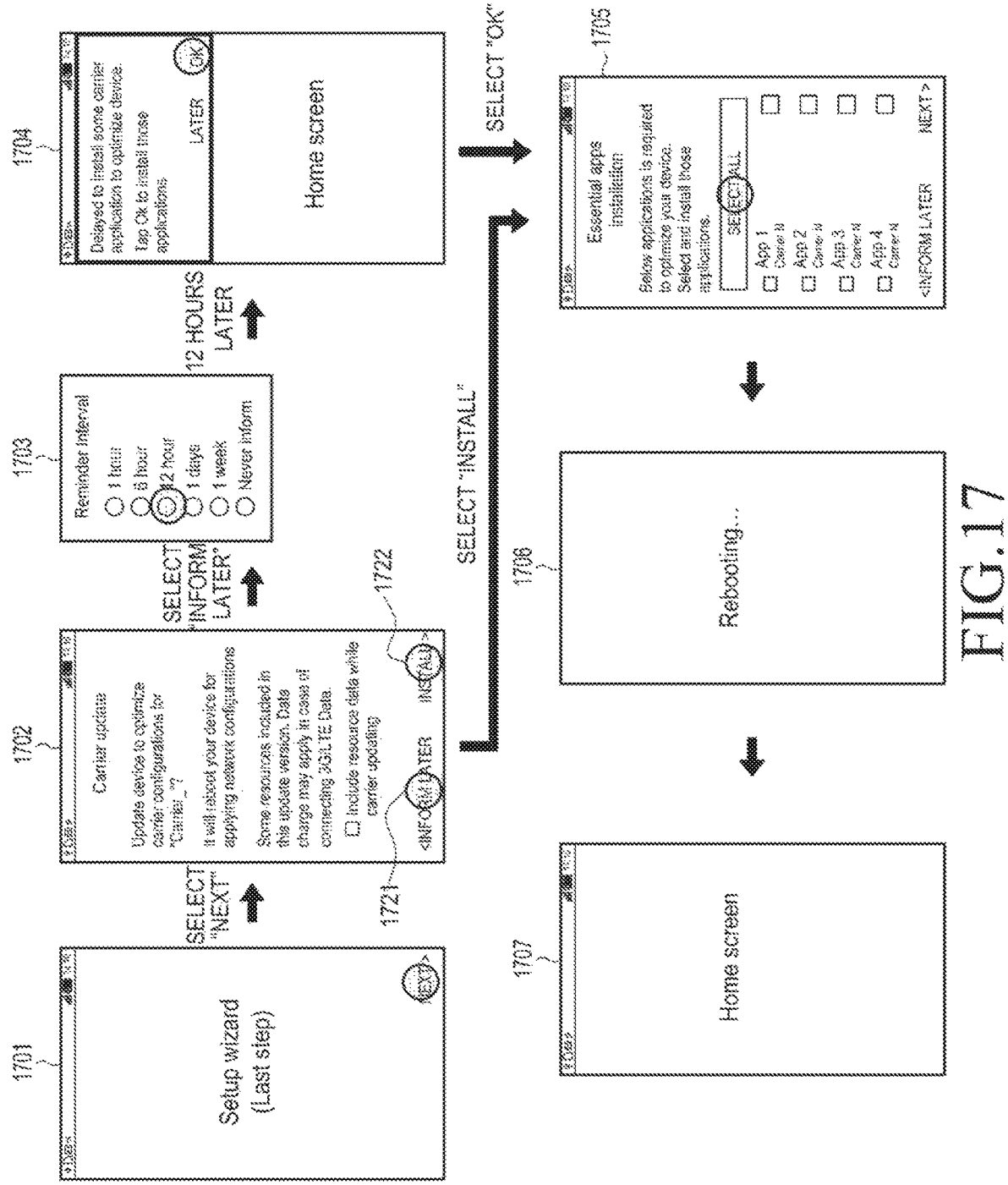
FIG. 17 illustrates an example of a screen configuration for updating the configuration that is related to a carrier according to an embodiment of the present disclosure.

FIG. 17 illustrates an example of a screen configuration for updating the configuration that is related to a carrier according to an embodiment of the present disclosure.

Referring to FIG. 17, if one or more of the updatable configurations for a specific carrier is selected, the electronic device may display a guidance screen 1701 for installing the update for the corresponding carrier.

According to various embodiments of the present disclosure, the user may select "NEXT" in order to go to the next step in the guidance screen 1701. For example, when "NEXT" is selected, the electronic device may display the carrier configuration to be updated or may display content related to the update through a carrier update screen 1702.

The carrier update guidance screen 1702 may include an "INFORM LATER" item 1721 to execute the carrier update after a configured period of time or an "INSTALL" item 1722 to install the updated configuration related to the carrier.

According to various embodiments of the present disclosure, if the "INFORM LATER" item is selected, the electronic device may display a reminder interval setting screen 1703 for configuring the time to execute the carrier updating operation. For example, the user may select the reminder time (e.g., 12 hours) through the reminder interval setting screen.

According to various embodiments of the present disclosure, when the configured time (e.g., 12 hours) expires, the electronic device may inform that the carrier updating operation has been delayed, and may display a screen 1704 asking whether the download for the updated configuration is to be executed. For example, an enquiry screen 1704 may include a "LATER" item to delay the update operation once more or an "OK" item to execute the update.

According to various embodiments of the present disclosure, if the "INSTALL" item is selected in the carrier update guidance screen 1702 or the enquiry screen 1704, the electronic device may display the updated configuration related to the carrier (e.g., the applications to be installed). For example, a list of applications to be installed in relation to the carrier may be displayed through an essential apps installation screen 1705.

The user may select a selection item for each of the applications or may select a "SELECT ALL" item for selecting all the applications in the essential apps installation screen 1705 in order to thereby select the applications to be installed. For example, when the user selects one or more applications from the essential apps installation screen 1705 and then selects a "NEXT" item, the electronic device may install the selected applications.

According to various embodiments of the present disclosure, when the installation of the selected applications is completed, the electronic device may reboot. For example, when the electronic device reboots, a screen 1706 showing that the rebooting operation is in progress may be displayed.

According to various embodiments of the present disclosure, when the electronic device reboots, a home screen of the electronic device 1707 may be displayed.

Figure 18:
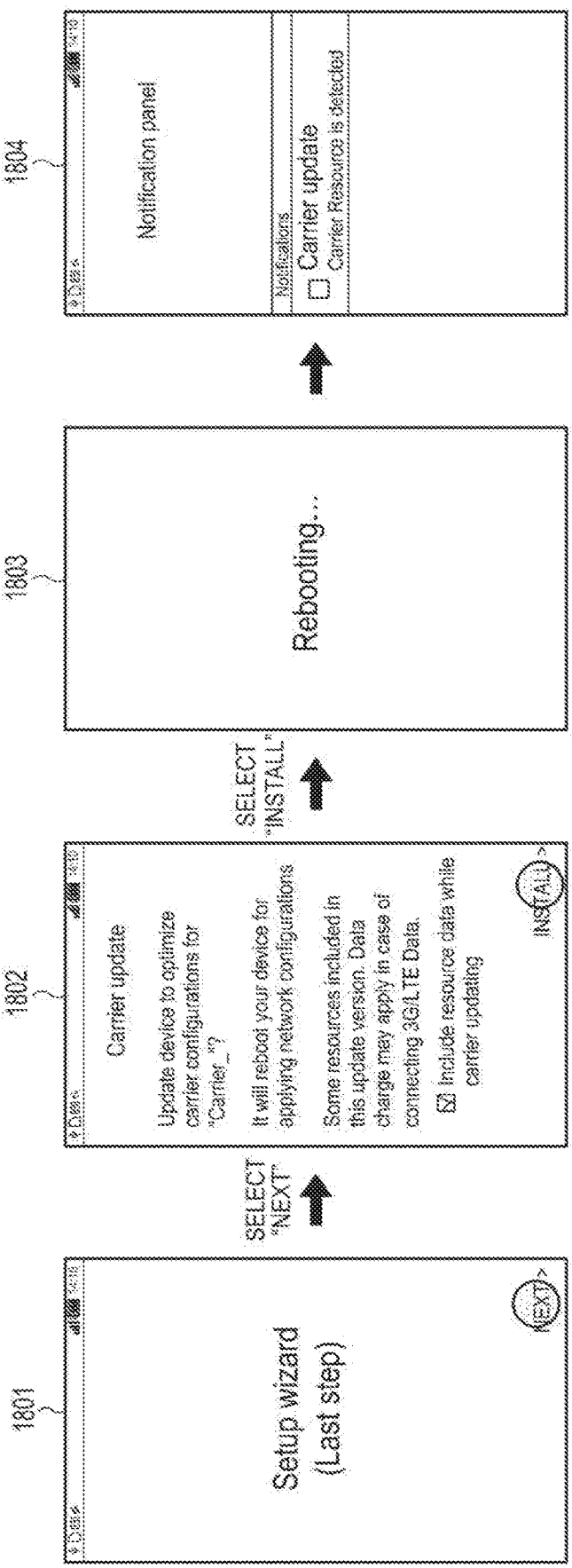
FIG. 18 illustrates an example of a screen configuration for updating the software configuration according to an embodiment of the present disclosure.

FIG. 18 illustrates an example of a screen configuration for updating the software configuration according to an embodiment of the present disclosure.

Referring to FIG. 18, the electronic device may display an update installation screen 1801. For example, the update installation screen 1801 may be displayed to set the configuration information that is required by a specific provider in relation to the software installed in the electronic device when the electronic device is activated for use or the SIM is inserted into the electronic device for the first time.

If the "Next" item is selected in the update installation screen 1801, the electronic device may display a screen 1802 showing that the configuration related to the provider is to be updated. For example, the update notification screen 1802 may contain information stating that the update related to the provider will be executed; the electronic device may reboot during the update; and the communication data may be charged according to the type of communication network (e.g., third generation (3G) or long term evolution (LTE)) for receiving the information.

According to various embodiments of the present disclosure, the user may agree with the information displayed on the update notification screen 1802, and may select an "Install" item in order to install the configuration.

According to the selection of the "Install" item, the electronic device may reboot. For example, the electronic device may display a screen 1803 showing that the electronic device is rebooting.

When the rebooting operation is completed, the electronic device may display a notification panel screen 1804 that includes update information (e.g., resources), which is not selected by the user. For example, the notification panel screen 1804 may contain information on the resources or applications, which are not identified or selected by the user when updating the configuration information required by the provider.

Figure 19:
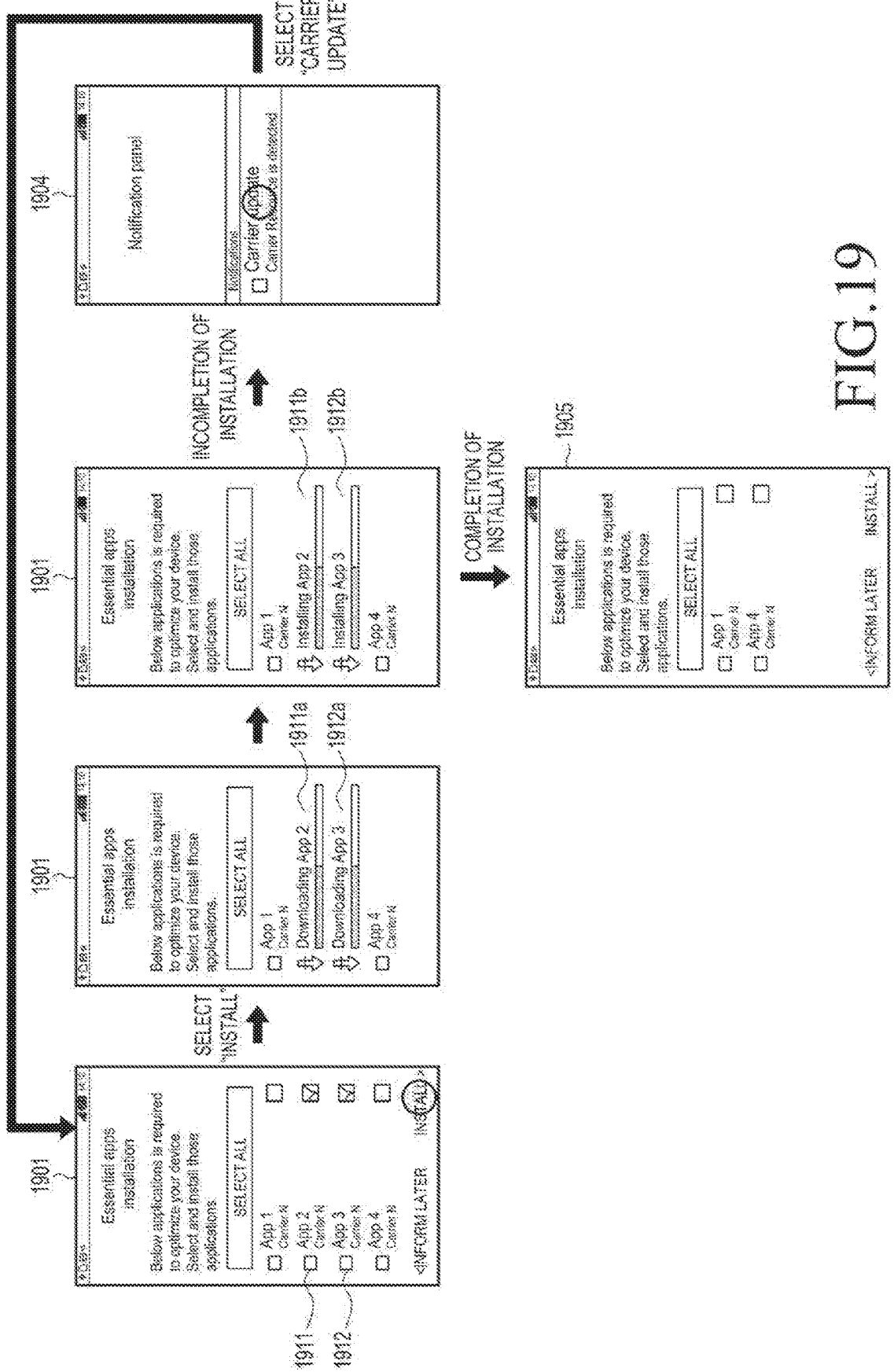
FIG. 19 illustrates an example of a screen configuration for downloading and installing the software configuration according to an embodiment of the present disclosure.

FIG. 19 illustrates an example of a screen configuration for downloading and installing the software configuration according to an embodiment of the present disclosure.

Referring to FIG. 19, the electronic device may display an essential apps installation screen 1901 that contains a list of the applications that are required to be updated in relation to a specific provider. For example, the essential apps installation screen 1901 may include a list of the applications that are updated or required to be installed by the provider, selection items for selecting one or more applications to be installed, or an "Install" button for installation.

According to various embodiments of the present disclosure, when the user selects applications to be installed (e.g., App 1 1911 or App 2 1912) and selects the "Install" button, the electronic device may perform the download of the selected applications (e.g., App 1 1911 or App 2 1912). For example, the essential apps installation screen 1901 may display the download status 1911a or 1912a for each of the selected applications.

According to various embodiments of the present disclosure, when the download of the applications selected by the user is completed, the electronic device may install the downloaded applications. For example, the essential apps installation screen 1901 may display the installation status 1911b or 1912b for each of the downloaded applications. For example, the electronic device may display a notification panel screen 1904 or an essential apps installation screen 1905 according to whether the installation of the downloaded applications is completed.

According to various embodiments of the present disclosure, if the installation of one or more applications is not completed, the electronic device may display the notification panel screen 1904. The notification panel screen 1904 may display a selection item ("carrier update") for displaying a list of the applications that are required to be installed by the provider or information stating that N applications, which are not completed to be installed, are detected (N apps are detected). For example, if the user selects "carrier update," the electronic device may display the essential apps installation screen 1901 in order to thereby display the information on the applications that are not completed.

According to various embodiments of the present disclosure, if the installation of the selected applications is completed, the electronic device may display a list of the applications except for the applications (e.g., App 1 1911 or App 2 1912), that have been installed, through the essential apps installation screen 1905.

Figure 20:
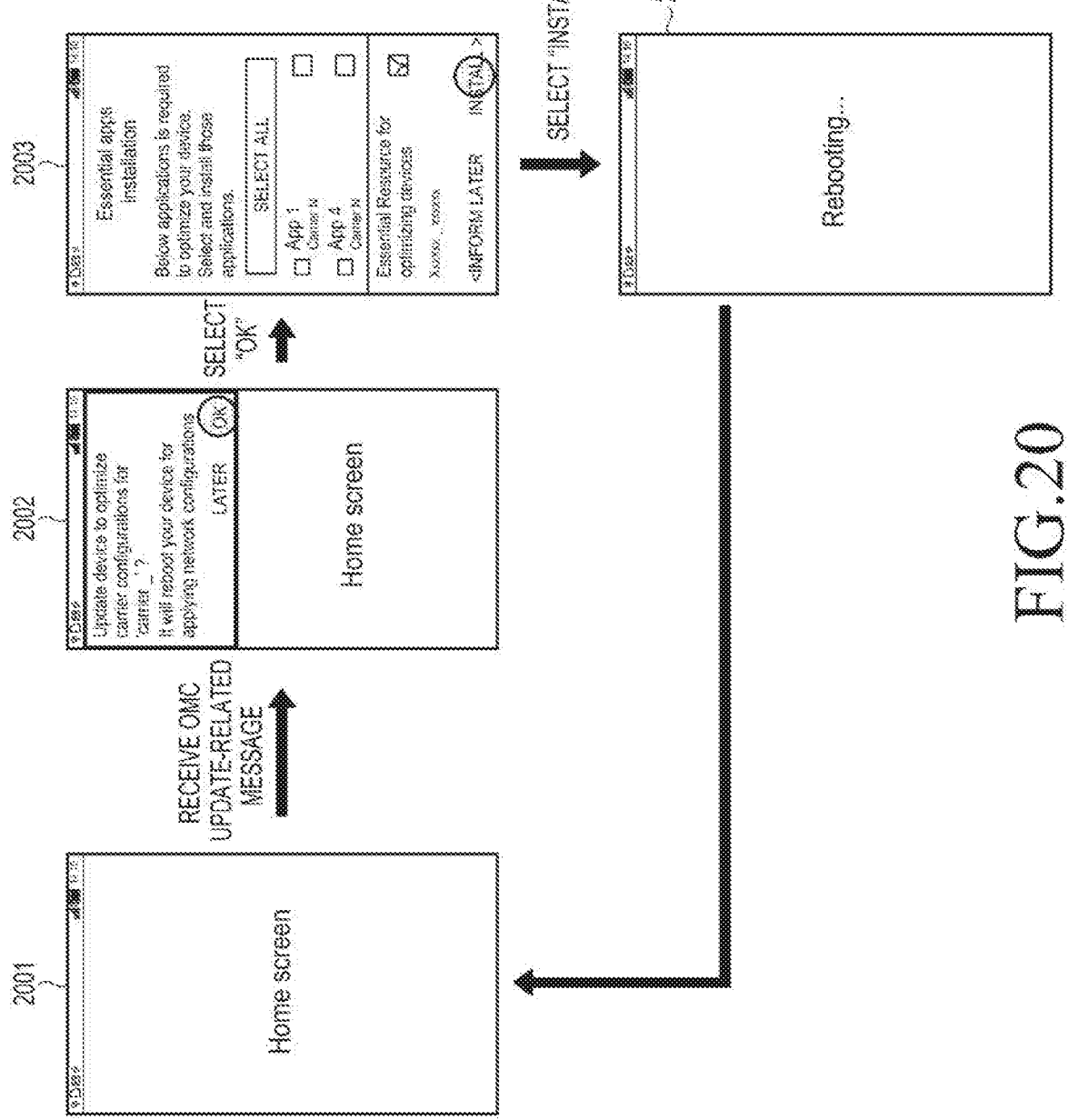
FIG. 20 illustrates an example of a screen configuration for updating the software configuration according to an embodiment of the present disclosure.

FIG. 20 illustrates an example of a screen configuration for updating the software configuration according to an embodiment of the present disclosure.

Referring to FIG. 20, when the electronic device receives a message (e.g., a push message) that contains the update information of the software configuration, the electronic device may parse the received message in order to thereby identify the applications to be updated in relation to the software configuration.

Referring to FIG. 20, the electronic device may display a home screen 2001.

According to various embodiments of the present disclosure, when a message related to the OMC update is received, the electronic device may ask if the software configuration related to the provider (e.g., 'carrier_') is to be updated, and may display a message screen 2002 showing that the electronic device may reboot according to the update operation. For example, the message screen 2002 may include an "OK" button to directly update the software configuration or a "LATER" button to execute the update after a specific period of time.

According to various embodiments of the present disclosure, if the user selects the "OK" button, the electronic device may display an essential apps installation screen 2003. For example, the essential apps installation screen 2003 may include a list of applications (e.g., App 1 or App 4), which are required to be installed by the provider, a selection item that asks whether essential resources are to be installed, an "INFORM LATER" button that requests the reminder later, or an "INSTALL" button to install the selected applications at the moment.

According to various embodiments of the present disclosure, if the user selects one or more applications and then selects the "INSTALL" button, the electronic device may proceed with the installation of the selected applications. The electronic device may display a screen 2004 informing of the reboot, and may reboot.

When the reboot is complete, the electronic device may display the home screen 2001 again.

Figure 21:
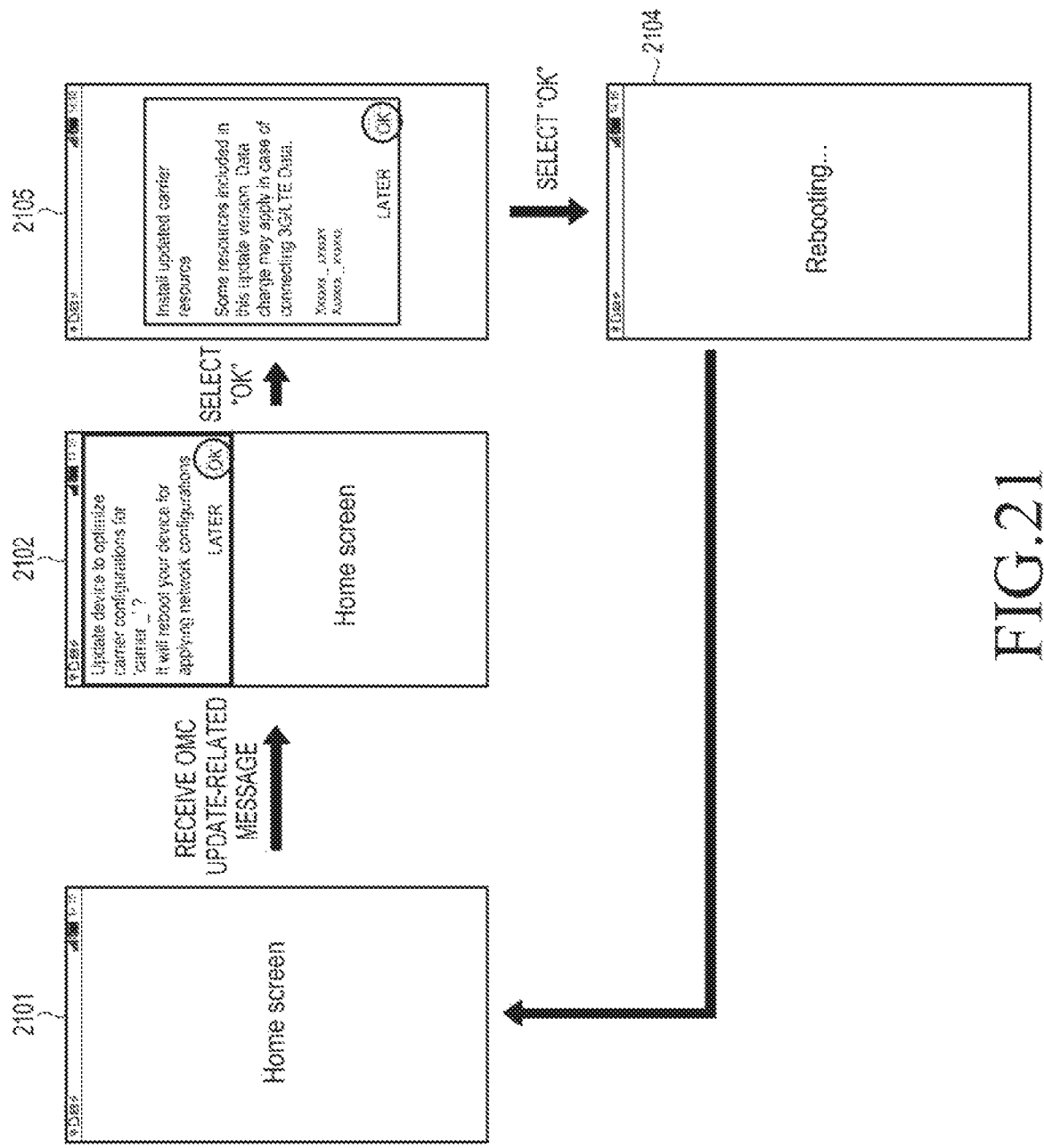
FIG. 21 illustrates an example of a screen configuration for updating the software configuration according to an embodiment of the present disclosure.

FIG. 21 illustrates an example of a screen configuration for updating the software configuration according to an embodiment of the present disclosure.

Referring to FIG. 21, the electronic device may display a home screen 2101.

According to various embodiments of the present disclosure, when the electronic device receives a message (e.g., a push message) that contains the update information of the software configuration, the electronic device may parse the received message in order to thereby identify the resources to be updated in relation to the software configuration. For example, when no application to be updated is identified, the electronic device may identify the resources to be updated.

According to various embodiments of the present disclosure, when a message related to the OMC update is received, the electronic device may ask if the software configuration related to the provider (e.g., 'carrier_') is to be updated, and may display a message screen 2102 showing that the electronic device may reboot according to the update operation. For example, the message screen 2102 may include an "OK" button to directly update the software configuration or a "LATER" button to execute the update after a specific period of time.

According to various embodiments of the present disclosure, if the user selects the "OK" button, the electronic device may display an installation updated carrier resource screen 2105. For example, the installation updated carrier resource screen 2105 may contain information stating that the installed resource contains the updated version and the download of the resource through a specific communication network (e.g., 3G or LTE) may be charged; updated resource information; an "INFORM LATER" button that requests the reminder later; or an "INSTALL" button to install the selected applications at the moment.

According to various embodiments of the present disclosure, if the user selects the "OK" button, the electronic device may proceed with the installation of the updated resources. The electronic device may display a screen 2104 informing of the reboot, and may reboot.

According to various embodiments of the present disclosure, when the reboot is complete, the electronic device may display the home screen 2101 again.

Figure 22:
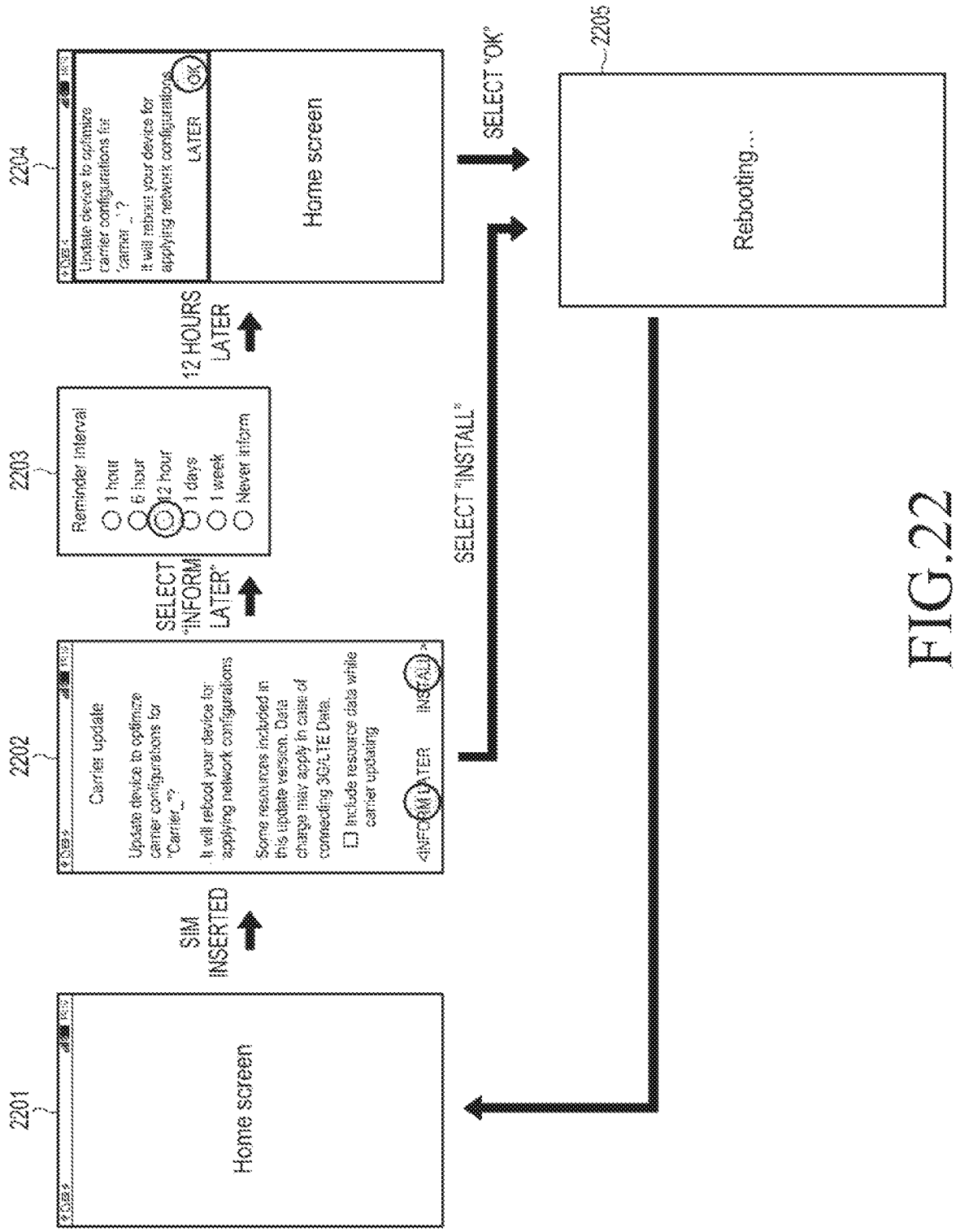
FIG. 22 illustrates an example of a screen configuration for updating the software configuration according to an embodiment of the present disclosure.

FIG. 22 illustrates an example of a screen configuration for updating the software configuration according to an embodiment of the present disclosure.

Referring to FIG. 22, the electronic device may display a home screen 2201.

According to various embodiments of the present disclosure, when the SIM is inserted into the electronic device, the electronic device may identify the information to be updated in relation to the software configuration. For example, if the information to be updated is identified in relation to the software configuration, the electronic device may display a carrier update screen 2202.

According to various embodiments of the present disclosure, the carrier update screen 2202 may include information that asks if the software configuration related to the provider (e.g., 'carrier_') is to be updated; information showing that the electronic device may reboot according to the update operation; information stating that the installed resource contains the updated version and the download of the resource through a specific communication network (e.g., 3G or LTE) may be charged; an "INFORM LATER" button that requests the reminder later; or an "INSTALL" button to install the resources at the moment.

According to various embodiments of the present disclosure, if the user selects the "INFORM LATER" button, the electronic device may display a notification setting screen 2203 to set the notification on the information to be updated. For example, the notification setting screen 2203 may include a selection item for selecting the time to receive the notification on the information to be updated.

According to various embodiments of the present disclosure, when the user selects "12 hours" in the notification settings screen 2203, the electronic device may ask if the software configuration related to the provider (e.g., 'carrier_') is to be updated after 12 hours, and may display a message screen 2204 stating that the electronic device may reboot according to the update operation. For example, the message screen 2204 may include an "OK" button to directly update the software configuration or a "LATER" button to execute the update after a specific period of time.

According to various embodiments of the present disclosure, if the user selects the "INSTALL" button through the carrier update screen 2202, or if the user selects the "OK" button through the message screen 2204, the electronic device may proceed with the installation for the updated software configuration. The electronic device may display a screen 2205 informing of the reboot, and may reboot.

According to various embodiments of the present disclosure, when the reboot is complete, the electronic device may display the home screen 2201 again.

Figure 23:
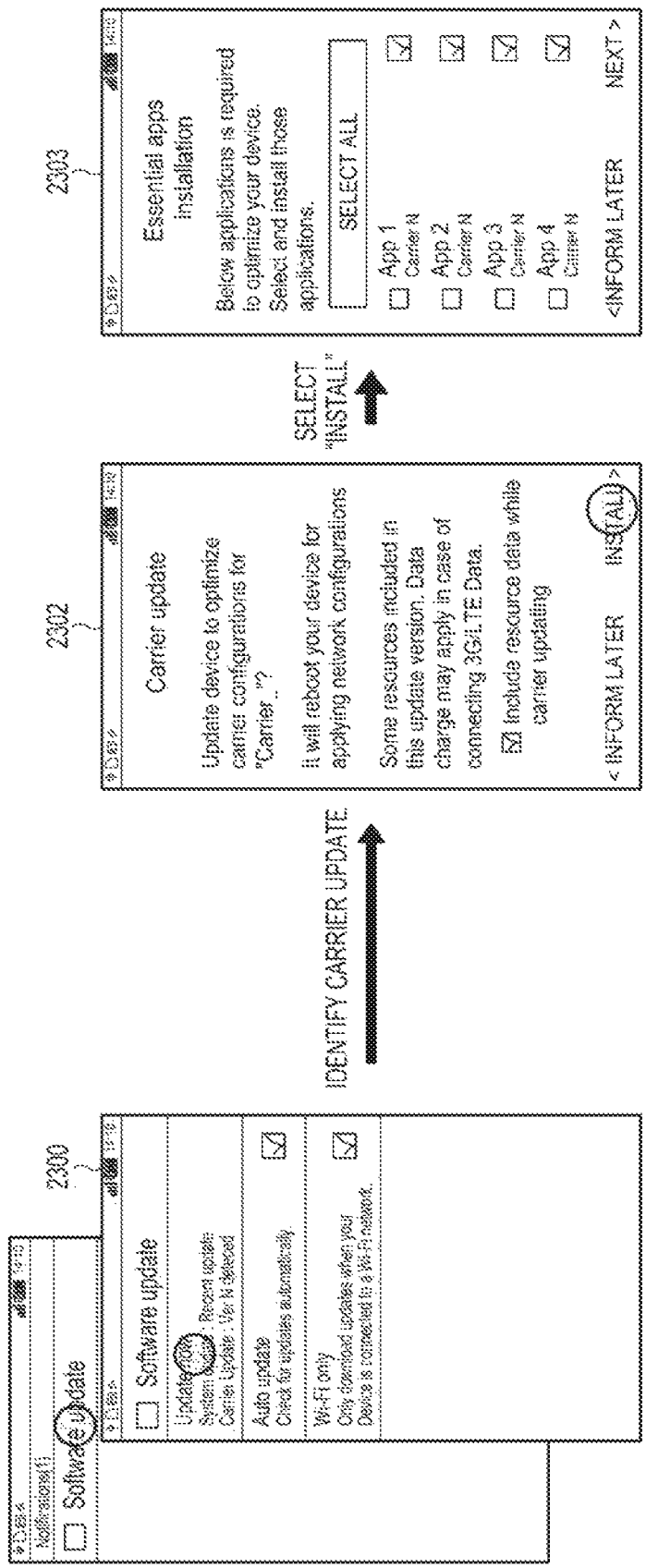
FIG. 23 illustrates an example of a screen configuration for updating the software configuration according to an embodiment of the present disclosure.

FIG. 23 illustrates an example of a screen configuration for updating the software configuration according to an embodiment of the present disclosure.

Referring to FIG. 23, the electronic device may provide a menu by which the user may identify the update software configuration.

Referring to FIG. 23, the user may execute a software update menu in order to identify the updated software configuration in relation to the provider. For example, the software update menu may include a button for executing the update ("Update now") 2300, and information on the updated system or provider.

According to various embodiments of the present disclosure, if the user selects the button 2300 for executing the update, the electronic device may check the update information related to the provider and may display a carrier update screen 2302.

According to various embodiments of the present disclosure, the carrier update screen 2302 may contain information that asks if the software configuration related to the provider (e.g., 'carrier_') is to be updated; information that informs of the reboot of the electronic device according to the update operation; information stating that the installed resource contains the updated version and the download of the resource through a specific communication network (e.g., 3G or LTE) may be charged; an "INFORM LATER" button that requests the reminder later; or an "INSTALL" button to install the resources immediately.

According to various embodiments of the present disclosure, if the user selects the "INSTALL" button through the carrier update screen 2302, the electronic device may display an essential apps installation screen 2303. For example, the essential apps installation screen 2003 may include a list of applications that are updated or required to be installed by the provider; a selection item for selecting one or more applications to be installed; an "INFORM LATER" button that requests the reminder later; or a "NEXT" button to execute the next installation operation.

Figure 24:
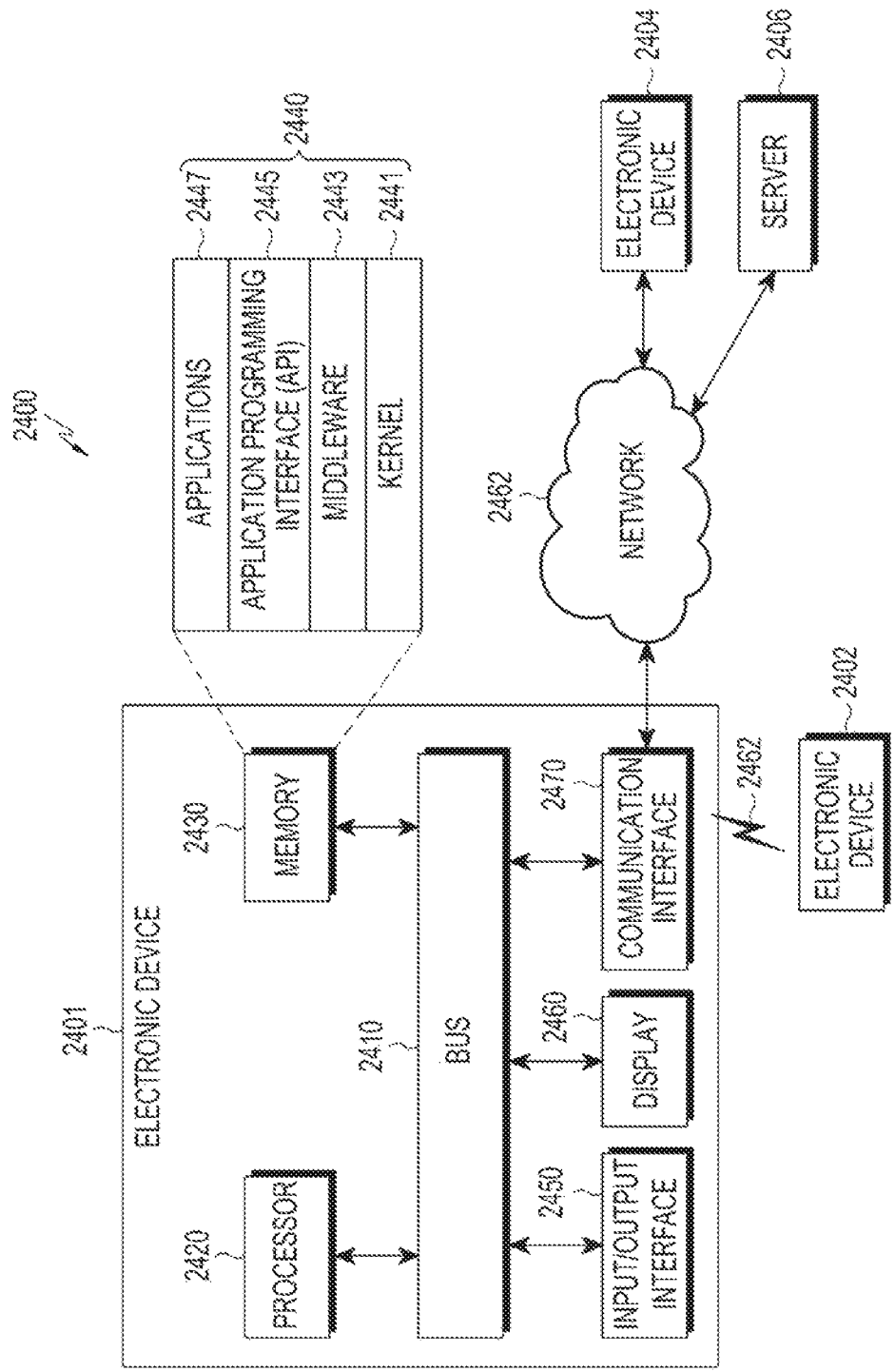
FIG. 24 illustrates an example of a network environment according to an embodiment of the present disclosure.

FIG. 24 illustrates an example of a network environment according to an embodiment of the present disclosure.

Referring to FIG. 24, the network environment 2400 may include an electronic device 2401, one or more electronic devices (e.g., the first external electronic device 2402 or the second external electronic device 2404), or a server 2406, and such elements may be connected with each other through a network 2462 or may be connected with the electronic device 2401 through a communication module 2470 of the electronic device 2401.

The electronic device 2401 may include a bus 2410, a processor 2420, a memory 2430, an input/output interface 2450, a display 2460, and the communication module 2470.

In various embodiments, the electronic device 2401 may omit one or more of the elements, or may further include other elements.

The bus 2410 may connect the elements 2410 to 2470 to each other, and may include a circuit that transmits communication data (e.g., control messages and/or data) between the elements.

The processor 2420 may include at least one of a CPU, an AP, or a communication processor (CP). The processor 2420 may process a calculation or data related to the control and/or communication of one or more other elements of the electronic device 2401.

The memory 2430 may include a volatile and/or non-volatile memory. For example, the memory 2430 may store instructions or data related to one or more other elements of the electronic device 2401. The memory 2430 may store software and/or programs 2440. For example, the programs 2440 may include a kernel 2441, middleware 2443, an application programming interface (API) 2445, and/or applications 2447. At least some of the kernel 2441, the middleware 2443, or the API 2445 may be referred to as an operating system (OS).

The kernel 2441 may control or manage system resources (e.g., the bus 2410, the processor 2420, or the memory 2430), which are used to execute the operation or function that is implemented in other programs (e.g., the middleware 2443, the API 2445, or the application program 2447). In addition, the kernel 2441 may provide an interface by which the middleware 2443, the API 2445, or the application programs 2447 may access each element of the electronic device 2401 for control or management.

The middleware 2443 may play the intermediate role between the API 2445 or the application programs 2447 and the kernel 2441 in order to communicate with each other for the transmission and reception of data.

In addition, the middleware 2443 may process one or more operation requests received from the application program 2447 according to priority. For example, the middleware 2443 may give priority for using the system resources (e.g., the bus 2410, the processor 2420, or the memory 2430) of the electronic device 2401 to the one or more application programs 2447. The middleware 2443 may perform scheduling or load-balancing for the one or more operation requests by processing the one or more operation requests according to the priority given to the one or more application programs 2447.

The API 2445 may include an interface by which the application program 2447 controls a function that is provided by the kernel 2441 or the middleware 2443. For example, the API 2445 may include one or more interfaces or functions (e.g., instructions) for file control, window control, image processing, or text control.

The input/output interface 2450 may play the role of an interface that transfers instructions or data received from a user or other external devices to other elements of the electronic device 2401. In addition, the input/output interface 2450 may output instructions or data received from the other elements of the electronic device 2401 to the user or the other external devices.

The display 2460 may include a liquid crystal display (LCD), a light-emitting diode (LED) display, an organic LED display, a micro-electromechanical system (MEMS) display, or an electronic paper display. For example, the display 2460 may display a variety of content (e.g., text, images, videos, icons, symbols, or the like) to the user. The display 2460 may include a touch screen, and may receive a touch input, a gesture input, a proximity input, or a hovering input, by using electronic pens or a user's body part.

The communication interface 2470 may configure communication between the electronic device 2401 and external devices (e.g., the first external electronic device 2402, the second external electronic device 2404, or a server 2406). For example, the communication interface 2470 may be connected to the network 2462 through wireless communication or wired communication in order to thereby communicate with the external devices (e.g., the second external electronic device 2404 or the server 2406).

For example, the wireless communication may use, as a cellular communication protocol, at least one of LTE, LTE-advanced (LTE-A), code division multiple access (CDMA), wideband CDMA (WCDMA), a universal mobile telecommunications system (UMTS), wireless broadband (WiBro), global system for mobile communications (GSM), or the like. The wireless communication may include a short-range communication 2464. The short-range communication 2464, for example, may include at least one of Wi-Fi, Bluetooth, near field communication (NFC), or a global navigation satellite system (GNSS). The GNSS may include at least one of a GPS, a global navigation satellite system (GLONASS), the BeiDou navigation satellite system (BeiDou), the Galileo, or the European global satellite-based navigation system according to the usage area or bandwidth. Hereinafter, "GPS" may be interchangeably used with "GNSS." The wired communication may include at least one of a universal serial bus (USB), a high definition multimedia interface (HDMI), recommended standard 232 (RS-232), or a plain old telephone service (POTS). The network 2462 may include at least one of telecommunication networks, such as a computer network (e.g., local area network (LAN) or wide area network (WAN)), the Internet, or a telephone network.

The first and the second external electronic devices 2402 and 2404 may be the same as, or different from, the electronic device 2401 in its type. The server 2406 may include a group of one or more servers. According to various embodiments of the present disclosure, all or some of the operations that are executed in the electronic device 2401 may be executed by the external devices (e.g., the first external electronic device 2402, the second external electronic device 2404, or the server 2406). In the case where the electronic device 2401 executes a specific function or service automatically or by request, the electronic device 2401 may make a request to other external devices (e.g., the first external electronic device 2402, the second external electronic device 2404, or the server 2406) for at least some of the functions related to the function or service additionally, or instead of, executing the same by itself. The external devices (e.g., the first external electronic device 2402, the second external electronic device 2404, or the server 2406) may execute the requested function or additional function, and may deliver the result thereof to the electronic device 2401. The electronic device 2401 may provide the requested function or service by providing the result or by additionally processing the same. To this end, for example, cloud computing, distributed computing, or client-server computing technology may be used.

Figure 25:
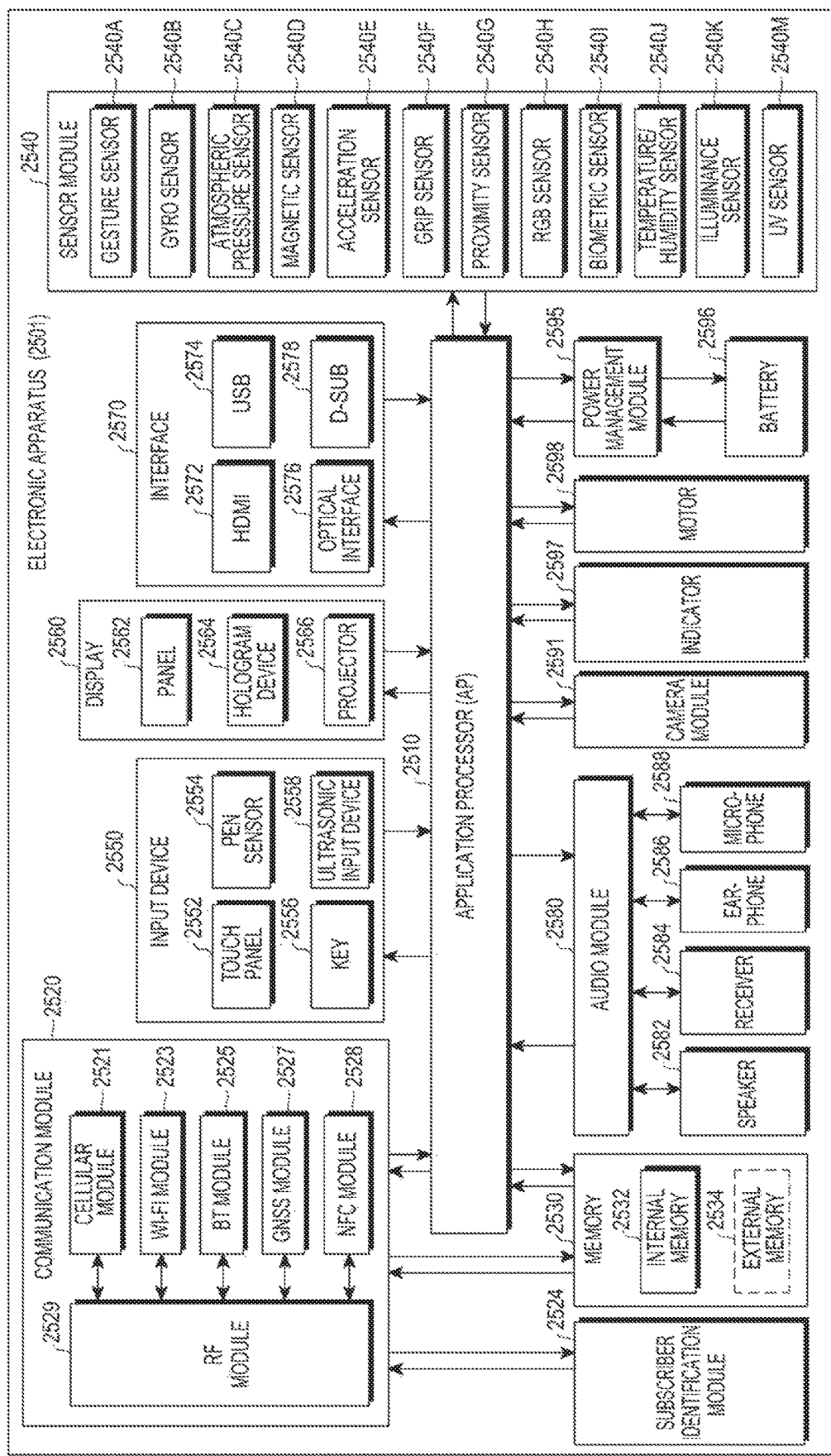
FIG. 25 is a block diagram showing an example of a configuration of an electronic device according to an embodiment of the present disclosure.

FIG. 25 is a block diagram showing an example of a configuration of the electronic device according to an embodiment of the present disclosure.

Referring to FIG. 25, the electronic device 2501, for example, may include all or some of the elements of the electronic device 2401 shown in FIG. 24. The electronic device 2501 may include one or more processors (e.g., APs) 2510, a communication module 2520, a SIM 2524, a memory 2530, a sensor module 2540, an input device 2550, a display 2560, an interface 2570, an audio module 2580, a camera module 2591, a power management module 2595, a battery 2596, an indicator 2597, and a motor 2598.

The processor 2510 may control a multitude of hardware or software elements connected with the processor 2510, and may perform the processing of various pieces of data and a calculation, by performing an operating system or application programs. The processor 2510 may be implemented by, for example, a system on chip (SoC). The processor 2510 may further include a graphics processing unit (GPU) and/or an image signal processor. The processor 2510 may include at least some (e.g., a cellular module 2521) of the elements shown in FIG. 25. The processor 2510 may load instructions or data received from one or more other elements (e.g., a non-volatile memory) to a volatile memory to then process the same, and may store a variety of data in a non-volatile memory.

The communication module 2520 may have the same or similar configuration as the communication module 2470 of FIG. 24. The communication module 2520, for example, may include the cellular module 2521, a Wi-Fi module 2523, a Bluetooth module 2525, a GNSS module 2527 (e.g., a GPS module, a GLONASS module, the BeiDou module, or the Galileo module), an NFC module 2528, and a radio frequency (RF) module 2529.

The cellular module 2521 may provide voice calls, video calls, text messaging, or Internet service through communication networks. The cellular module 2521 may perform the identification and authentication of the electronic device 2501 in communication networks by using the SIM (e.g., a SIM card) 2524. The cellular module 2521 may perform at least some of the functions provided by the processor 2510. The cellular module 2521 may include a CP.

Each of the Wi-Fi module 2523, the Bluetooth module 2525, the GNSS module 2527, or the NFC module 2528 may include a processor for processing data that is transmitted and received through the corresponding module. At least some (e.g., two or more) of the cellular module 2521, the Wi-Fi module 2523, the Bluetooth module 2525, the GNSS module 2527, or the NFC module 2528 may be included in one IC or one IC package.

The RF module 2529 may transmit and receive data (e.g., RF signals). The RF module 2529 may include, for example, a transceiver, a power amp module (PAM), a frequency filter, a low noise amplifier (LNA), antennas, or the like. According to an embodiment, at least one of the cellular module 2521, the Wi-Fi module 2523, the Bluetooth module 2525, the GNSS module 2527 and the NFC module 2528 may transmit and receive RF signals through separated modules.

The SIM 2524 may include a card adopting a SIM and/or an embedded SIM, and may include inherent identification information (e.g., an ICCID) or subscriber information (e.g., an IMSI).

The memory 2530 (e.g., the memory 2430) may include an internal memory 2532 or an external memory 2534. The internal memory 2532, for example, may include at least one of volatile memories (e.g., a dynamic random access memory (DRAM), a static RAM (SRAM), a synchronous dynamic RAM (SDRAM), or the like) or non-volatile memories (e.g., an one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like).

The external memory 2534 may further include a flash drive; for example, a compact flash (CF), a secure digital (SD), a micro-SD, a mini-SD, an extreme digital (xD), a multi-media card (MMC), a memory stick, or the like. The external memory 2534 may be functionally and/or physically connected with the electronic device 2501 through various interfaces.

The sensor module 2540 may measure physical quantities and may detect the operation state of the electronic device 2501 to thereby convert the measured or detected information to electric signals. The sensor module 2540 may include at least one of a gesture sensor 2540A, a gyro-sensor 2540B, an atmospheric sensor 2540C, a magnetic sensor 2540D, an acceleration sensor 2540E, a grip sensor 2540F, a proximity sensor 2540G a color sensor 2540H (e.g., a red-green-blue (RGB) sensor), a biometric sensor 2540I, a temperature/humidity sensor 2540J, an illuminance sensor 2540K, or an ultra violet (UV) sensor 2540M. Alternatively or additionally, the sensor module 2540 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2540 may further include a control circuit for controlling one or more sensors included therein. In various embodiments of the present disclosure, the electronic device 2501 may further include a processor, as a part of the processor 2510 or separately from the processor 2510, which is configured to control the sensor module 2540 in order to thereby control the processor 2510 while the processor 2510 is in a sleep mode.

The input device 2550 may include a touch panel 2552, a (digital) pen sensor 2554, keys 2556, or an ultrasonic input device 2558. The touch panel 2552 may use at least one of, for example, a capacitive type, a pressure type, an infrared type, or an ultrasonic type. In addition, the touch panel 2552 may further include a control circuit. The touch panel 2552 may further include a tactile layer in order to thereby provide a user with a tactile reaction.

The (digital) pen sensor 2554 may be a part of the touch panel, or may include a separate recognition sheet. The keys 2556 may include physical buttons, optical keys, or a keypad. The ultrasonic input device 2558 detects acoustic waves generated in input means through a microphone (e.g., a microphone 2588) to thereby identify data corresponding to the acoustic waves.

The display 2560 (e.g., the display 2460) may include a panel 2562, a hologram device 2564, or a projector 2566. The panel 2562 may include the same or similar elements as the display 2460 of FIG. 24. The panel 2562 may be implemented to be, for example, flexible, transparent, or wearable. The panel 2562 may be configured with the touch panel 2552 as a single module. The hologram device 2564 may display three-dimensional (3D) images in the air by using interference of light. The projector 2566 may display images by projecting light onto a screen. The screen may be positioned, for example, inside or outside the electronic device 2501. According to an embodiment, the display 2560 may further include a control circuit for controlling the panel 2562, the hologram device 2564, or the projector 2566.

The interface 2570 may include an HDMI 2572, a USB 2574, an optical interface 2576, or a D-subminiature (D-sub) 2578. The interface 2570 may be included in, for example, the communication interface 2470 shown in FIG. 24. Additionally or alternatively, the interface 2570 may include a mobile high-definition link (MHL) interface, an SD card/ MMC interface or an infrared data association (IrDA) standard interface.

The audio module 2580 may convert a sound into an electric signal, and vice versa. At least some elements of the audio module 2580 may be included, for example, in the input/output interface 2450 shown in FIG. 24. For example, the audio module 2580 may process voice information that is input or output through a speaker 2582, a receiver 2584, earphones 2586, or a microphone 2588.

The camera module 2591 is a device for photographing still and moving images. The camera module 2591 may include one or more image sensors (e.g., a front sensor or a rear sensor), lenses, an image signal processor (ISP), or a flash (e.g., an LED or a xenon lamp).

The power management module 2595 may manage the power of the electronic device 2501. The power management module 2595 may include a power management IC (PMIC), a charger IC, or a battery or fuel gauge. The PMIC may be implemented by a wired charging type and a wireless charging type. The wireless charging type may encompass a magnetic resonance type, a magnetic induction type, or an electromagnetic wave type, and additional circuits for wireless charging, such as coil loops, resonance circuits, or rectifiers, may be provided. The battery gauge may measure the remaining power of the battery 2596, a charging voltage and current, or temperature. The battery 2596 may include a rechargeable battery or a solar battery.

The indicator 2597 may display a specific state, such as a booting state, the message state or the charging state of the whole or a part (e.g., the processor 2510) of the electronic device 2501. The motor 2598 may convert an electric signal to a mechanical vibration, and may provide a vibration or a haptic effect. Although not shown, the electronic device 2501 may include a processing device (e.g., a GPU) for supporting mobile TV. The processing device for supporting mobile TV may process media data according to standards, such as, for example, digital multimedia broadcasting (DMB), digital video broadcasting (DVB), or media flow.

Each of the above-described component elements of hardware according to the present disclosure may be configured with one or more components, and the names of the corresponding component elements may vary based on the type of electronic device.

In various embodiments of the present disclosure, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 26:
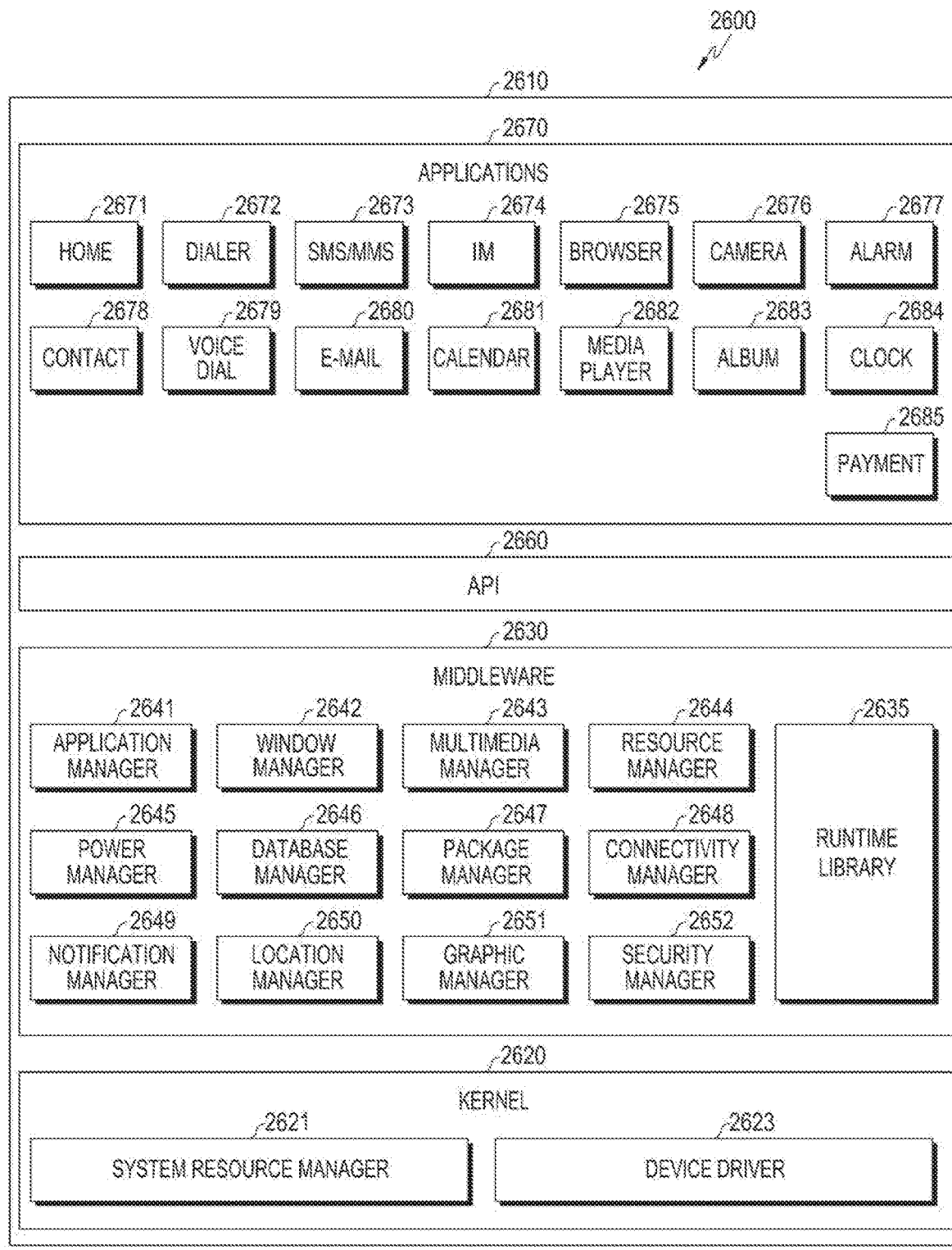
FIG. 26 is a block diagram showing an example of a program module according to an embodiment of the present disclosure.

FIG. 26 is a block diagram showing an example of a program module according to an embodiment of the present disclosure.

Referring to FIG. 26, the programming module 2610 (e.g., the program 2440) may include an OS for resources related to the electronic device (e.g., the electronic device 2401) and/or various applications (e.g., the application programs 2447), which are operated under the operating system.

The operating system may be Android, iOS, Windows, Symbian, Tizen, Bada, or the like.

The programming module 2610 may include a kernel 2620, middleware 2630, an API 2660, and/or applications 2670. At least some of the program module 2610 may be preloaded in the electronic device, or may be downloaded from external electronic devices (e.g., the first external electronic device 2402, the second external electronic device 2404, or the server 2406).

The kernel 2620 (e.g., the kernel 2441) may include a system resource manager 2621 or a device driver 2623. The system resource manager 2621 may perform the control, allocation, or collection of the system resources. The system resource manager 2621 may include, for example, a process management unit, a memory management unit, or a file system management unit. The device driver 2623 may include a display driver, a camera driver, a Bluetooth driver, a common memory driver, a USB driver, a keypad driver, a Wi-Fi driver, an audio driver, or an inter-process communication (IPC) driver.

The middleware 2630 may provide functions required in common for the applications 2670, or may provide various functions through the API 2660 in order to allow the applications 2670 to effectively use limited system resources in the electronic device. The middleware 2630 (e.g., the middleware 2443) may include at least one of a run time library 2635, an application manager 2641, a window manager 2642, a multimedia manager 2643, a resource manager 2644, a power manager 2645, a database manager 2646, a package manager 2647, a connectivity manager 2648, a notification manager 2649, a location manager 2650, a graphic manager 2651, or a security manager 2652.

The run time library 2635 may include a library module that a compiler uses in order to add new functions through programming languages while the applications 2670 are executed. The run time library 2635 may perform the management of an input/output, the management of a memory, or a function of an arithmetic calculation.

The application manager 2641 may manage a life cycle of at least one of the applications 2670. The window manager 2642 may manage a graphical user interface (GUI) resource used in the screen. The multimedia manager 2643 may identify formats for reproducing various media files, and may perform encoding or decoding of media files by using a codec corresponding to each format. The resource manager 2644 may manage resources, such as source codes, memories, or storage spaces of one or more applications 2670.

The power manager 2645 may manage a battery or power by operating in association with a basic input/output system (BIOS), and may provide power information necessary for the operation of the electronic device. The database manager 2646 may manage to create, retrieve, or change a database that is to be used in one or more applications 2670. The package manager 2647 may manage the installation or updating of the applications that are distributed in the form of a package file.

The connectivity manager 2648 may manage a wireless connection, such as Wi-Fi or Bluetooth. The notification manager 2649 may display or notify of events, such as received messages, appointments, or proximity notifications, to the user without disturbance. The location manager 2650 may manage location information of the electronic device. The graphic manager 2651 may manage graphic effects to be provided to the user or user interfaces related thereto. The security manager 2652 may provide a general security function required for the system security or user authentication. In the case of the electronic device (e.g., the electronic device 2401) adopting a phone call function, the middleware 2630 may further include a telephony manager for managing the functions of a voice call or a video call of the electronic device.

The middleware 2630 may include a middleware module through a combination of various functions of the above-described elements. The middleware 2630 may provide a module that is specialized according to the type of operating system in order to provide differentiated functions. In addition, the middleware 2630 may dynamically omit some of the existing elements, or may add new elements.

The API 2660 (e.g., the API 2445) may be a group of API programming functions, and may be provided with a different configuration according to an operating system. For example, one set of APIs may be provided to each platform in the case of Android or iOS, and two or more sets of APIs may be provided to each platform in the case of Tizen.

The applications 2670 (e.g., the applications 2447) may include one or more applications that execute functions, such as home 2671, a dialer 2672, short message service (SMS)/multimedia message service (MMS) 2673, instant messages 2674, a browser 2675, a camera 2676, an alarm 2677, contact 2678, voice dial 2679, e-mail 2680, a calendar 2681, a media player 2682, an album 2683, a clock 2684, healthcare (e.g., measuring the amount of exercise or blood glucose), provision of environmental information (e.g., providing atmospheric pressure, humidity, or temperature information), or payment system 2685.

The applications 2670 may include an application that supports the exchange of information between the electronic device (e.g., the electronic device 2401) and external electronic devices (e.g., the first external electronic device 2402 or the second external electronic device 2404) (hereinafter, referred to as "information-exchange application" for the convenience of explanation). The information-exchange application, for example, may include a notification relay application for relaying specific information to the external electronic devices, or a device management application for managing the external electronic devices.

The notification relay application may include a function of transferring notification information generated in other applications (e.g., the SMS/MMS application, the e-mail application, the healthcare application, or the environmental information application) of the electronic device to external electronic devices (e.g., the first external electronic device 2402 or the second external electronic device 2404). In addition, the notification relay application, for example, may receive notification information from the external electronic device to then provide the same to the user.

The device management application may manage (e.g., install, delete, or update): one or more functions (e.g., turning on and off the external electronic device (or some elements) or adjusting the brightness (or resolution) of a display) of the external electronic device (e.g., the first external electronic device 2402 or the second external electronic device 2404) that communicates with the electronic device; applications executed in the external electronic device; or services (e.g., a phone call service or a messaging service) provided by the external electronic device.

The applications 2670 may include applications that are designated according to the attribute (e.g., the healthcare application of a mobile medical device) of the external electronic device (e.g., the first external electronic device 2402 or the second external electronic device 2404). The applications 2670 may include applications that are received from the external electronic devices (e.g., the server 2406, the first external electronic device 2402, or the second external electronic device 2404). The applications 2670 may include preloaded applications or third party applications that can be downloaded from a server. The names of the components of the program module 2610 of the illustrated embodiment of the present disclosure may be changed according to the type of operating system.

According to various embodiments of the present disclosure, at least some of the programming module 2610 may be embodied as software, firmware, hardware, or a combination of at least two of them. At least some of the program module 2610 may be implemented (e.g., executed) by, for example, the processor (e.g., the processor 2510). At least a part of the program module 2610 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific IC (ASIC) chip, a field-programmable gate array (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 2420), may cause the one or more processors to execute the function corresponding to the instruction. The computer-readable storage medium may be, for example, the memory 2430.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements.

The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Figure 27:
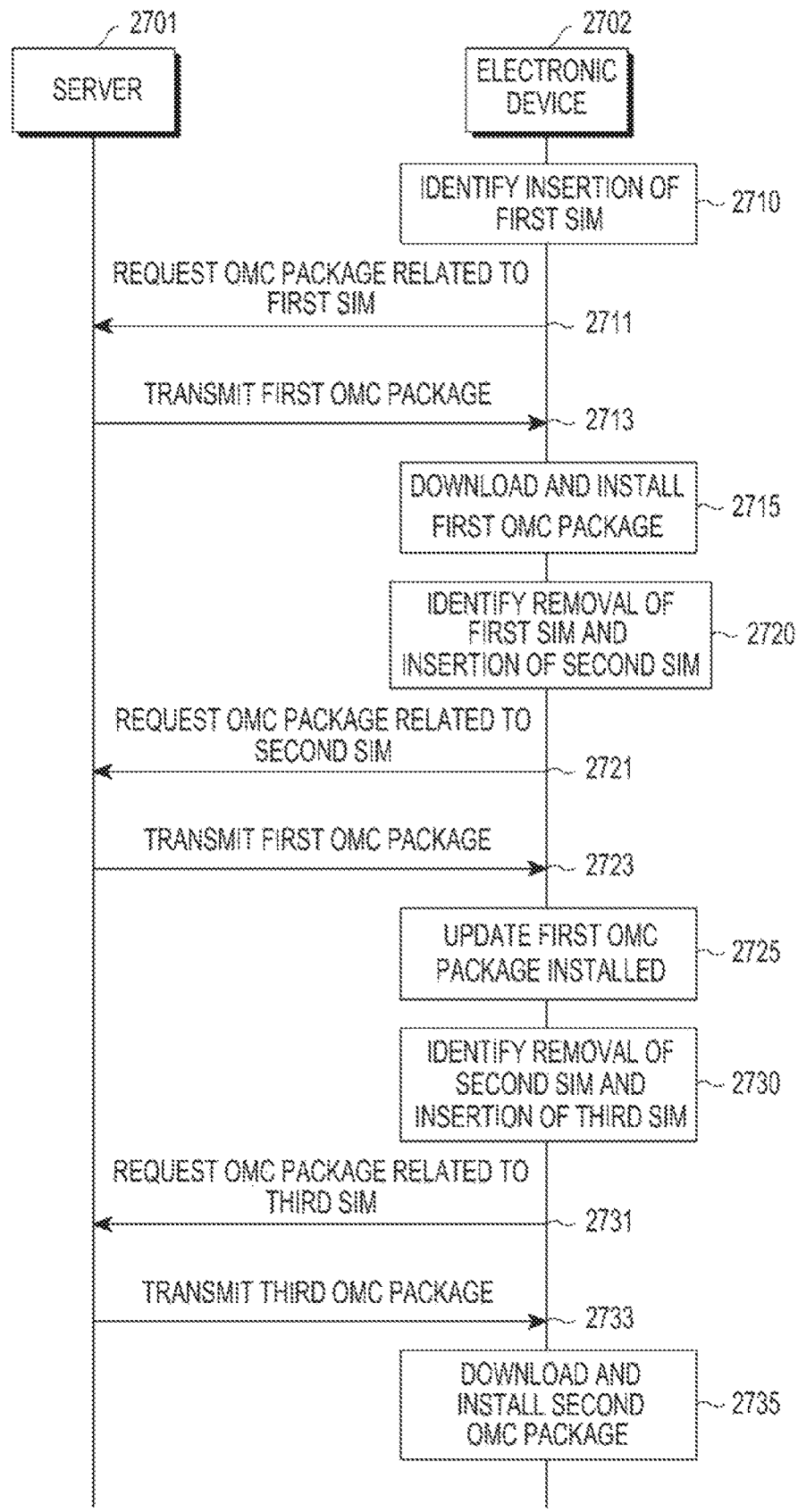
FIG. 27 is a flowchart illustrating an example of an operation of transmitting and installing OMC package information between a server and an electronic device according to an embodiment of the present disclosure.

FIG. 27 is a flowchart illustrating an example of an operation of transmitting and installing OMC package information between the server and the electronic device according to an embodiment of the present disclosure.

Referring to FIG. 27, the electronic device 2702 may include a SIM insertion portion, and may identify the information of the SIM that is inserted into, or removed from, the SIM insertion portion.

According to various embodiments of the present disclosure, the SIM information may contain the MCC or the MNC. For example, the server 2901 may identify the MCC and MNC in order to thereby determine the OMC package that is related to the corresponding SIM.

In operation 2710, the electronic device 2702 may recognize the first SIM that is inserted into the electronic device.

In operation 2711, the electronic device 2702 may make a request to the server 2701 for the OMC package related to the inserted first SIM.

In operation 2713, the server 2701 may transmit information on the first OMC package related to the first SIM to the electronic device 2702.

In operation 2715, the electronic device may identify and download the information on the first OMC package received from the server 2701, and may install the first downloaded OMC package in the electronic device 2702.

According to various embodiments of the present disclosure, the installation of the OMC package may include applying the setting information contained in the OMC package to the electronic device 2702 and installing one or more resources or applications in the electronic device 2702.

In operation 2720, the electronic device 2702 may recognize that the first SIM has been removed from the electronic device 2702 and the second SIM has been inserted.

In operation 2721, the electronic device 2702 may make a request to the server 2701 for the OMC package for the second inserted SIM.

In operation 2723, the server 2701 may transmit the information on the first OMC package, which is related to the second SIM, to the electronic device 2702. For example, the first OMC package may include information on a plurality of SIMs, and the server 2701 may transmit the information on the same OMC package to the corresponding electronic device according to the OMC package request for the first SIM or the second SIM.

In operation 2725, the electronic device 2702 may compare the first OMC package, which is installed, with the first OMC package information on the second SIM, which is received, in order to thereby update the first installed OMC package. For example, the update operation may include identifying setting information that has changed in the first installed OMC package and information on the resources or application to be additionally installed, based on the first received OMC package information on the second SIM; and applying the same to the electronic device 2701.

In operation 2730, the electronic device 2702 may identify that the second SIM has been removed from the electronic device 2702 and that the third SIM has been inserted.

In operation 2731, the electronic device 2702 may make a request to the server 2701 for the OMC package for the third inserted SIM.

In operation 2733, the server 2701 may transmit the information on the second OMC package related to the third SIM to the electronic device 2702.

In operation 2735, the electronic device 2702 may identify and download the information on the second OMC package, which is received from the server 2701, and may install the second OMC package the electronic device 2702. For example, with the installation of the second OMC package that is different from the first OMC package, the first OMC package, which has been previously installed, may be replaced with the second OMC package, or the second OMC package may be further installed in addition to the first OMC package that has been previously installed.

Figure 28:
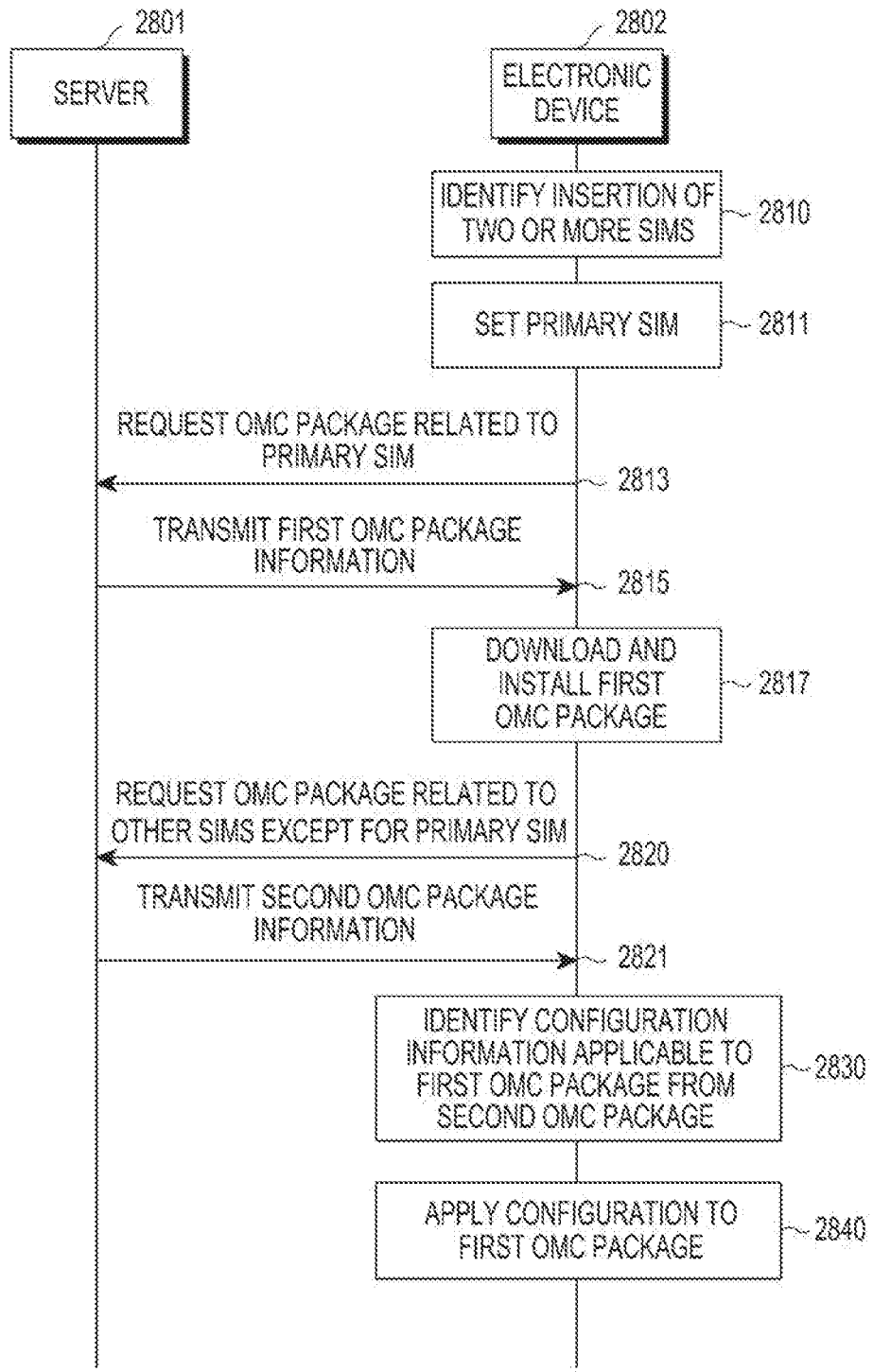
FIG. 28 is a flowchart illustrating an example of an operation of transmitting and installing OMC package information between a server and an electronic device according to an embodiment of the present disclosure.

FIG. 28 is a flowchart illustrating an example of an operation of transmitting and installing OMC package information between the server and the electronic device according to an embodiment of the present disclosure.

Referring to FIG. 28, the electronic device 2802 may include two or more SIM insertion portions, and may set a primary SIM among two or more SIMs that are inserted into the two or more SIM insertion portions.

In operation 2810, the electronic device 2802 may recognize two or more SIMs that are inserted.

In operation 2811, the electronic device 2802 may set a primary SIM among the two inserted SIMs. For example, the electronic device 2802 may set the primary SIM according to the setting information.

According to various embodiments of the present disclosure, the setting information for setting the primary SIM may contain language information (e.g., Korean or English), communication region information, or communication country information. For example, based on the language information set in the electronic device 2802 and the communication region or country information set for the inserted SIMs, the electronic device 2802 may select, as the primary SIM, the SIM that contains communication region information or country information, which corresponds to the set language information.

In operation 2813, the electronic device 2802 may make a request to the server 2801 for the OMC package that is related to the primary SIM.

In operation 2815, the server 2801 may transmit the information on the first OMC package that is related to the primary SIM to the electronic device 2802.

In operation 2817, the electronic device 2802 may download and install the first OMC package. According to various embodiments of the present disclosure, the installation of the first OMC package may include applying the setting information contained in the first OMC package to the electronic device 2802 and installing one or more resources and applications in the electronic device 2802.

In operation 2820, the electronic device 2802 may make a request to the server 2801 for the information on the OMC package that is related to another SIM other than the primary SIM.

In operation 2821, the server 2801 may transmit the information on another SIM (i.e., the information on the second OMC package) to the electronic device 2802.

According to various embodiments of the present disclosure, the number of other SIMs is not limited to the embodiment, and a plurality of SIMs may be inserted according to the number of SIM insertion portions provided in the electronic device 2802. In this case, the OMC package information may be received as separate OMC package information for each SIM, or may be received as a single OMC package containing a plurality of pieces of SIM information from the server 2801.

In operation 2830, the electronic device 2802 may identify the setting information, which can be applied to the electronic device in which the first OMC package has been installed, from the second OMC package. For example, when the first OMC package is related to the primary SIM, the electronic device 2802 may identify the setting information from the second OMC package, and may apply the identified setting information to the electronic device 2802 in which the first OMC package has been installed.

In operation 2840, the electronic device 2802 may apply the identified setting information in the second OMC package to the electronic device in which the first OMC package has been installed.

According to various embodiments of the present disclosure, the electronic device 2802 may apply the setting information that is identified through the first OMC package; install the applications or resources; and apply the setting information (e.g., an access point name (APN) or the MIMS setting information), which is contained in the second OMC package.

Figure 29:
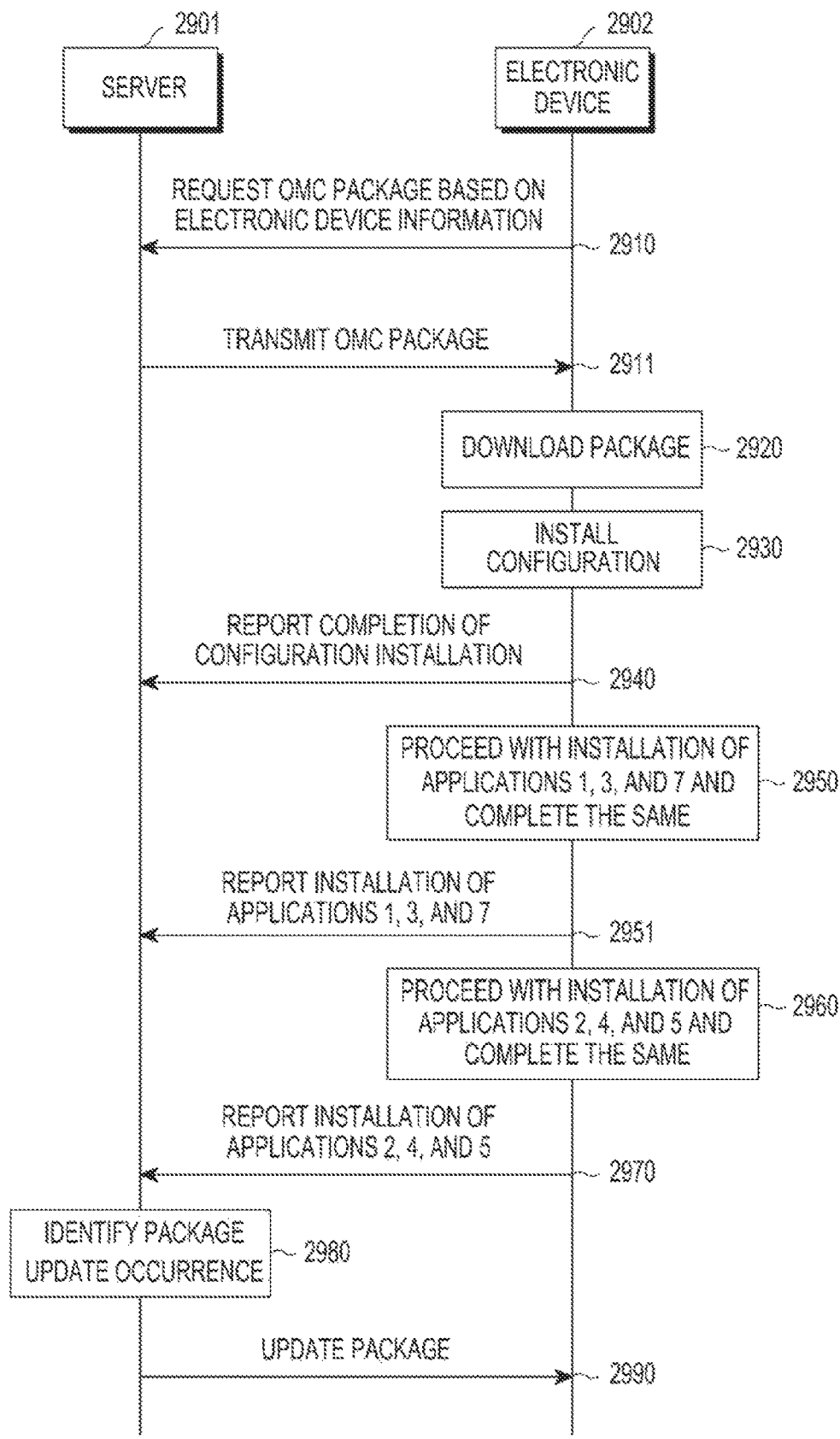
FIG. 29 is a flowchart illustrating an example of an operation of reporting the installed OMC package information between a server and an electronic device according to an embodiment of the present disclosure.

FIG. 29 is a flowchart illustrating an example of an operation of reporting the installed OMC package information between the server and the electronic device according to an embodiment of the present disclosure.

Referring to FIG. 29, in operation 2910, the electronic device 2902 may make a request to the server 2901 for the OMC package based on the electronic device information.

In operation 2911, the server 2901 may transmit, to the electronic device 2902, the information on the OMC package that is related to the information of the electronic device 2902 (e.g., the SIM information).

In operation 2920, the electronic device 2902 may receive the information on the OMC package, and may access a specific server in order to thereby download the OMC package corresponding to the received information.

In operation 2930, the electronic device 2902 may install the software of the electronic device 2902 based on the setting information contained in the downloaded OMC package.

In operation 2940, the electronic device 2902 may report the completion of the configuration installation to the server 2901.

In operation 2950, the electronic device 2902 may install Application 1, Application 3, or Application 7 based on the application installation information contained in the downloaded OMC package, and may identify the completion of the installation.

In operation 2951, the electronic device 2902 may report the completion of the installation of Application 1, Application 3, or Application 7 to the server 2901.

In operation 2960, the electronic device 2902 may install Application 2, Application 4, or Application 5 based on the application installation information contained in the downloaded OMC package, and may identify the completion of the installation.

In operation 2970, the electronic device 2902 may report the completion of the installation of Application 2, Application 4, or Application 5 to the server 2901.

According to various embodiments of the present disclosure, the server 2901 may store the reported installation information of the applications for each electronic device. For example, when the update information on the OMC package for a specific electronic device is identified, the server 2901 may determine, as the update information, the installation information of the applications, which are not reported, among the stored setting information of the applications with respect to the corresponding electronic device.

In operation 2980, the server 2901 may identify that the OMC package related to the electronic device 2902 is updated.

In operation 2990, the server 2901 may inform the electronic device 2902 of the update information of the OMC package. For example, the server 2901 may include the update information of the OMC package in the push message to then be transmitted to the electronic device 2902.

According to various embodiments of the present disclosure, the update information of the OMC package may contain the application information that is requested to be additionally installed in the previously installed OMC package. For example, the application information contained in the OMC package may include information of the applications except for the applications 1, 2, 3, 4, 5, or 7, which have been reported to complete the installation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a communication unit;
    a memory; and
    a processor configured to:
    identify subscriber identity module (SIM) information corresponding to a SIM, which is functionally connected with the electronic device,
    control the communication unit to transmit the SIM information to a server,
    control the communication unit to receive, from the server, software configuration information required by at least one network provider corresponding to the SIM information, the software configuration information being added to existing information related to the SIM information or the existing information is changed to the software configuration information,
    determine at least one of setting information and information related to applications or resources being installed to change the software configuration information included in a software stored in the memory, based at least in part on the received software configuration information, and
    in response to determining the at least one of the setting information and the information related to the applications or the resources, set a specific function of the electronic device according to the setting information or install the applications or the resources.

2. The electronic device of claim 1, wherein the processor is further configured to:
    receive, as at least a portion of the software information or the resource information, installation policy information or download server information; and
    change at least a portion of the software or obtain other software by using the installation policy information or the download server information.

3. The electronic device of claim 1, wherein the processor is further configured to display a user interface for receiving a user input through a display that is functionally connected with the electronic device in relation to the software that is changed, at least in part, or other software that is obtained.

4. The electronic device of claim 3, wherein the processor is further configured to transmit a request for additional information that is related to at least a portion of the software configuration information to the server based at least in part on the user input.

5. The electronic device of claim 4, wherein the processor is further configured to:
    receive the additional information from the server; and
    change at least a portion of the software or obtain other software based on the additional information.

6. The electronic device of claim 5, wherein the processor is further configured to receive information on the other software or resource information from at least one server that are different from the server by using route information that is contained in the additional information.

7. The electronic device of claim 1, wherein the processor is further configured to:
   identify the SIM information; and
   if the identified SIM information corresponds to a predetermined SIM state, determine that the software configuration information has been updated.

8. The electronic device of claim 7, wherein the processor is further configured to:
   receive the updated configuration information when it is determined that the software configuration information has been updated; and
   change at least a portion of the software or obtain other software based at least in part on the updated configuration information.

9. An operating method of an electronic device, the operating method comprising:
   identifying subscriber identity module (SIM) information corresponding to a SIM, which is functionally connected with the electronic device;
   transmitting the SIM information to a server;
   receiving software configuration information required by at least one network provider corresponding to the SIM information from the server, the software configuration information being added to existing information related to the SIM information or the existing information is changed to the software configuration information;
   determining at least one of setting information and information related to applications or resources being installed to change the software configuration information included in a software stored in the memory that is functionally connected with the electronic device, based at least in part on the received software configuration information; and
   in response to determining the at least one of the setting information and the information related to the applications or the resources, setting a specific function of the electronic device according to the setting information or installing the applications or the resources.

10. The method of claim 9, further comprising, in relation to the operation of changing at least a portion of the software or obtaining other software, displaying a user interface for receiving a user input through a display that is functionally connected with the electronic device.

11. The method of claim 10, further comprising transmitting a request for additional information that is related to at least a portion of the software configuration information to the server based at least in part on the user input.

12. The method of claim 11, further comprising:
   receiving the additional information from the server; and
   changing at least a portion of the software or obtaining other software based on the additional information.

13. The method of claim 12, further comprising receiving information on the other software or resource information from at least one server that are different from the server by using route information that is contained in the additional information.

14. The method of claim 9, further comprising:
   identifying software information or mandatory resource information, which is contained in the software configuration information; and
   changing at least a portion of the software or obtaining other software based at least in part on the software information or mandatory resource information.

15. An electronic device comprising:
   a communication unit; and
   a processor configured to:
   receive subscriber identity module (SIM) information corresponding to a SIM, which is functionally connected with a server, from the server,
   transmit, to the server, software configuration information required by at least one network provider corresponding to the SIM information, the software configuration information being added to existing information related to the SIM information or the existing information is changed to the software configuration information,
   determine at least one of setting information and information related to applications or resources being installed to change the software configuration information included in a software stored in the memory, which is functionally connected with the server based at least in part on the received software configuration information, and
   in response to determining the at least one of the setting information and the information related to the applications or the resources, set a specific function of the electronic device according to the setting information or install the applications or the resources.

16. The electronic device of claim 15, wherein the processor is further configured to store the records on the software configuration information transmitted from the server or from the server and other external devices in the memory that is functionally connected with the electronic device.

17. The electronic device of claim 15, wherein the processor is further configured to transmit a message that contains a notification corresponding to the software configuration information to the server when a response related to the transmitted configuration information is not received within a predetermined time.

18. The electronic device of claim 15, wherein the processor is further configured to transmit a message related to the update of the software configuration information to the server when the update of the configuration information is identified.

* * * * *